(12) United States Patent
Wang et al.

(10) Patent No.: US 12,113,455 B2
(45) Date of Patent: Oct. 8, 2024

(54) MULTILEVEL CONVERSION CIRCUIT HAVING FLYING CAPACITOR AND METHOD FOR PRE-CHARGING THE SAME

(71) Applicant: Delta Electronics (Shanghai) Co., Ltd., Shanghai (CN)

(72) Inventors: Yichao Wang, Shanghai (CN); Kai Dong, Shanghai (CN); Shuailin Du, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 86 days.

(21) Appl. No.: 17/810,639

(22) Filed: Jul. 4, 2022

(65) Prior Publication Data

US 2023/0020108 A1    Jan. 19, 2023

(30) Foreign Application Priority Data

Jul. 15, 2021    (CN) .......................... 202110801825.3

(51) Int. Cl.
*H02M 7/483*    (2007.01)
*H02M 1/00*    (2006.01)
*H02M 1/42*    (2007.01)

(52) U.S. Cl.
CPC ....... *H02M 7/4837* (2021.05); *H02M 1/0085* (2021.05); *H02M 1/4233* (2013.01)

(58) Field of Classification Search
CPC .......................... H02M 7/4837; H02M 1/0085
See application file for complete search history.

(56) References Cited

U.S. PATENT DOCUMENTS

| 10,404,175 | B2 | 9/2019 | Chakraborty et al. | |
| 10,536,073 | B2* | 1/2020 | Young | H02M 7/10 |
| 2021/0336530 | A1* | 10/2021 | Shen | H02M 1/32 |

FOREIGN PATENT DOCUMENTS

| CN | 107070277 B | 6/2019 |
| CN | 110545040 A | 12/2019 |

* cited by examiner

*Primary Examiner* — Jue Zhang
*Assistant Examiner* — Lakaisha Jackson
(74) *Attorney, Agent, or Firm* — CKC & Partners Co., LLC

(57) ABSTRACT

Multilevel conversion circuit having a flying capacitor and method for pre-charging the same are provided. The multilevel conversion circuit includes: a first bridge arm including a plurality of switches connected in series; a second bridge arm including a plurality of switches connected in series and a flying capacitor group, midpoints of the two bridge arms connected to a power supply and an inductor to form a series branch; a DC bus capacitor to which the two bridge arms are connected in parallel; a first voltage clamping module connected between a first end of the flying capacitor group and a first end of the DC bus capacitor; and a second voltage clamping module connected between a second end of the flying capacitor group and a second end of the DC bus capacitor.

30 Claims, 14 Drawing Sheets

200 after the multilevel conversion circuit is powered on, the power supply charges the DC bus capacitor through the corresponding switching devices of the first bridge arm and the corresponding switching devices of the second bridge arm — S201

MULTILEVEL CONVERSION CIRCUIT HAVING FLYING CAPACITOR AND METHOD FOR PRE-CHARGING THE SAME

CROSS-REFERENCE TO RELATED APPLICATIONS

This non-provisional application claims priority under 35 U.S.C. § 119(a) on patent applications Ser. No. 202110801825.3 filed on Jul. 15, 2021, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The invention relates to the field of power electronic technology, and particularly to a multilevel conversion circuit having a flying capacitor and a method for pre-charging the same.

BACKGROUND

As for Power Factor Correction (PFC) circuits, firstly, a DC bus capacitor is charged by use of the switches of the PFC circuit after the circuit is powered on, and then an auxiliary power supply which is electrically connected to the DC bus capacitor starts to operate so as to provide the work supply for the controller if the DC bus voltage reaches a preset value, and finally the PFC circuit begins to work in normal operation.

When the PFC circuit uses a multilevel conversion circuit with a flying capacitor, the main power switches is typically selected from those switches with a lower breakdown voltage. During the charging for the DC bus capacitor, the flying capacitor, the switches at an outer side thereof and the DC bus capacitor form a loop, and since a voltage across the flying capacitor is zero, the voltage across the DC bus capacitor will be applied to the switches at the outer side of the flying capacitor, such that the switches at the outer side of the flying capacitor have a risk of damage. In addition, after the multilevel conversion circuit begins to normally operate, the controller may turn on or turn off the switches and charge the flying capacitor. Because an initial voltage of the flying capacitor is zero, when the controller turns on one switch at the outer side of the flying capacitor, the DC bus voltage will be completely applied to another switch at the outer side of the flying capacitor, so the switch may have a high risk of damage. Therefore, when the multilevel conversion circuit with a flying capacitor is used, the switches at the outer side of the flying capacitor must be protected before the controller operates, and the flying capacitor needs to be pre-charged before the multilevel conversion circuit normally operates, thereby preventing over-voltage damage of the switches at the outer side of the flying capacitor, and ensuring normal operation of the multilevel conversion circuit.

SUMMARY

The disclosure provides a multilevel conversion circuit having a flying capacitor, including: a first bridge arm including a plurality of switches connected in series; a second bridge arm including a plurality of switches connected in series and a flying capacitor group, a midpoint of the second bridge arm and a midpoint of the first bridge arm are connected to a series branch, wherein the series branch is defined by a power supply and an inductor; a DC bus capacitor connected in parallel to the first bridge arm and the second bridge arm; a first voltage clamping module connected between a first end of the flying capacitor group and a first end of the DC bus capacitor; and a second voltage clamping module connected between a second end of the flying capacitor group and a second end of the DC bus capacitor.

The disclosure further provides a method for pre-charging a multilevel conversion circuit having a flying capacitor, wherein the multilevel conversion circuit includes a first bridge arm including a plurality of switches connected in series; a second bridge arm including a plurality of switches connected in series and a flying capacitor group, a midpoint of the second bridge arm and a midpoint of the first bridge arm connected to a power supply and an inductor to form a series branch; a DC bus capacitor to which the first bridge arm and the second bridge arm are both connected in parallel; a first voltage clamping module connected between a first end of the flying capacitor group and a first end of the DC bus capacitor; and a second voltage clamping module connected between a second end of the flying capacitor group and a second end of the DC bus capacitor; the pre-charging method including: after the multilevel conversion circuit is powered on, the power supply charges the DC bus capacitor through the corresponding switches of the first bridge arm and the corresponding switches of the second bridge arm.

The disclosure may satisfy application requirements of the multilevel conversion circuit having a flying capacitor by at least adding two voltage clamping units only, such as, voltage regulation diodes.

In addition, after the multilevel conversion circuit in the disclosure is powered on, when the DC bus capacitor is charged through the switches of the bridge arms, the switches on an outer side of the flying capacitor can be clamped for protection through the voltage clamping modules (e.g., the voltage regulation diodes), and after the auxiliary power supply is started, and powers the controller, the controller may pre-charge the flying capacitor by controlling action of the corresponding switches of the bridge arms. At this time, the switches on the outer side of the flying capacitor still can be protected through the voltage clamping modules, such that the switches are not easily damaged.

The additional aspects and advantages of the invention are partially explained in the below description, and partially becoming apparent from the description, or can be obtained through the practice of the invention.

BRIEF DESCRIPTION OF THE DRAWINGS

The exemplary embodiments are described in details with reference to the accompanying drawings, through which the above and other features and advantages of the invention will become more apparent.

DETAILED DESCRIPTION

Figure 1:
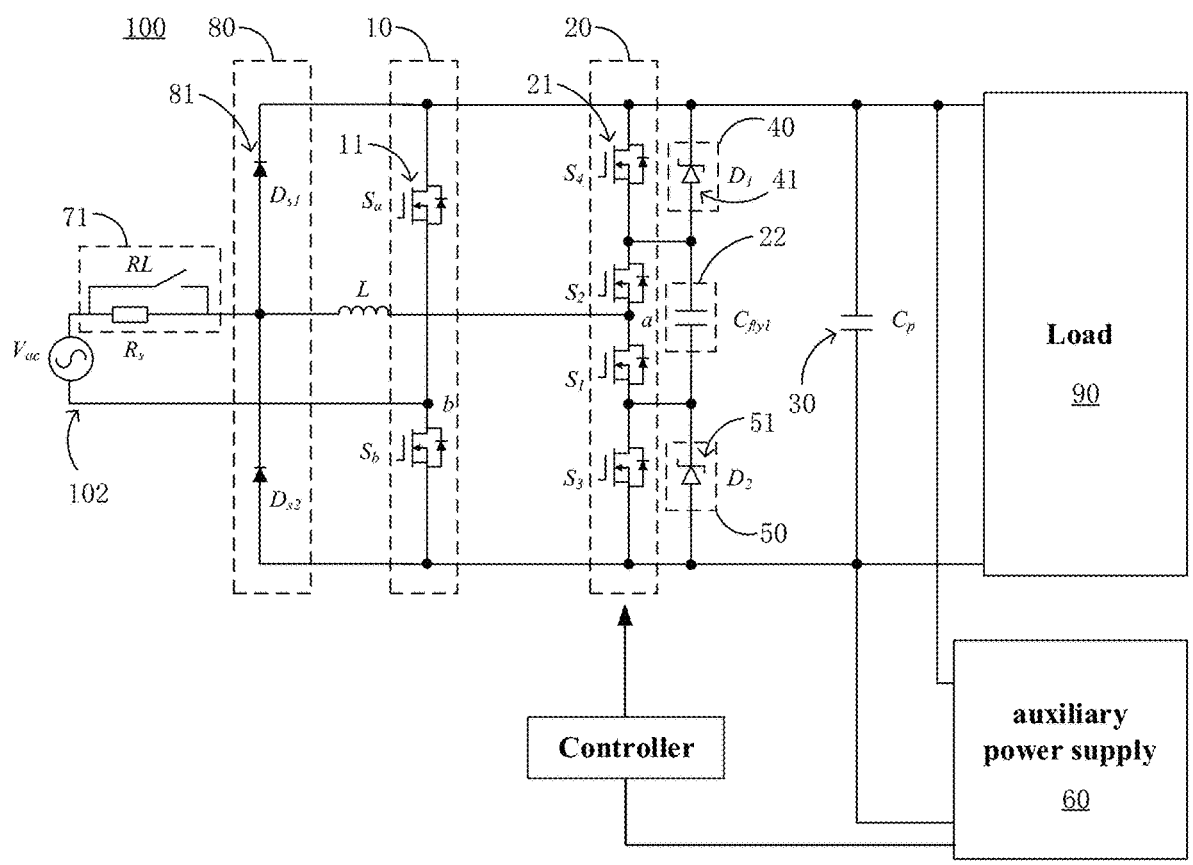
FIG. 1 is a three-level conversion circuit having a flying capacitor according to a first embodiment of the invention.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative phrases, such as, "upper" or "lower" to describe a relative relation of one signed component over another component. It shall be understood that if the signed device reverses to turn upside down, the described component on an "upper" side will become a component on a "lower" side. In addition, the terms "first", "second" and the like in the claims are only used as signs, instead of numeral limitations to objects.

Figure 2A:
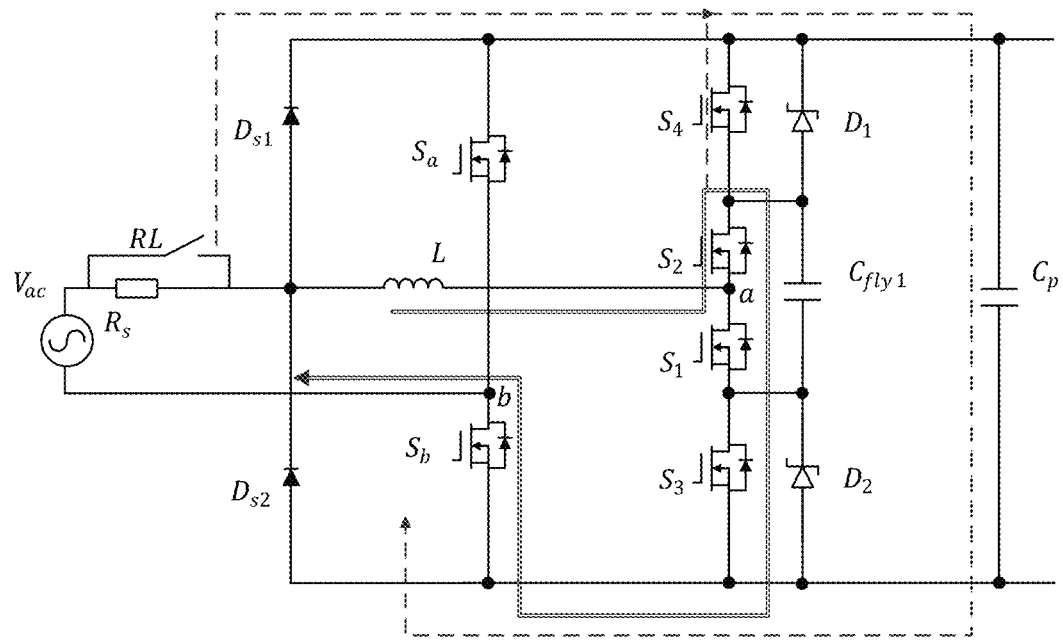
FIGS. 2A and 2B are schematic views of a charging loop (as shown by a dashed line) of a DC bus capacitor within positive and negative half periods formed after a multilevel conversion circuit is powered on, and a charging loop (as shown by a double line) of the flying capacitor within positive and negative half periods formed before a controller begins to operate, when a voltage $V_{ab}$ is higher than clamping voltages of voltage regulation diodes in the embodiment of FIG. 1.
Figure 2B:
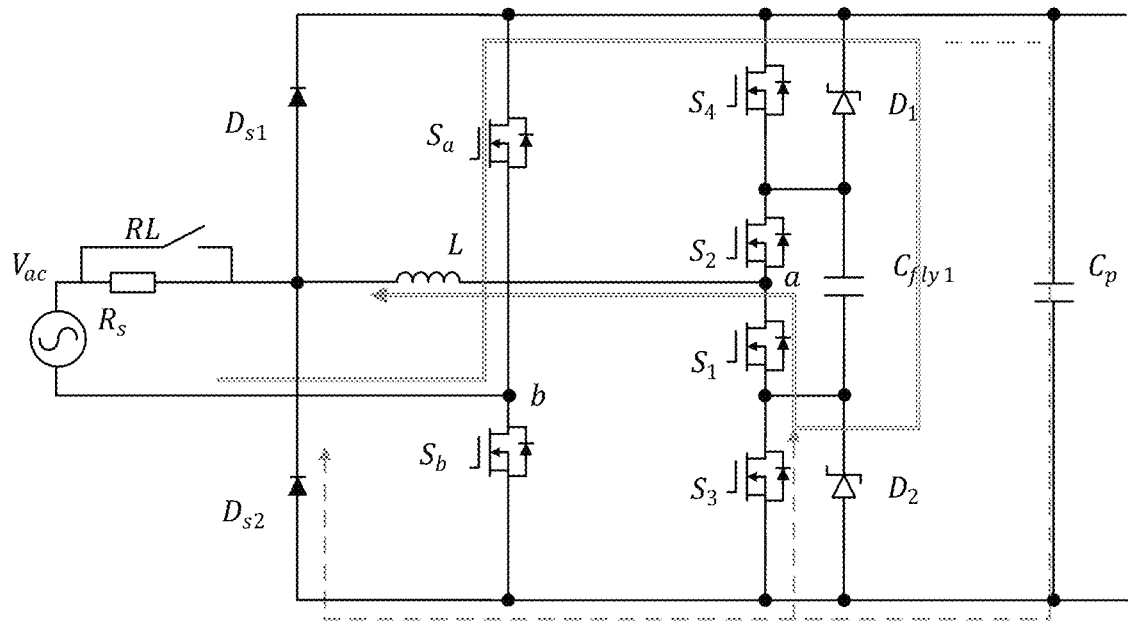
Figure 3A:
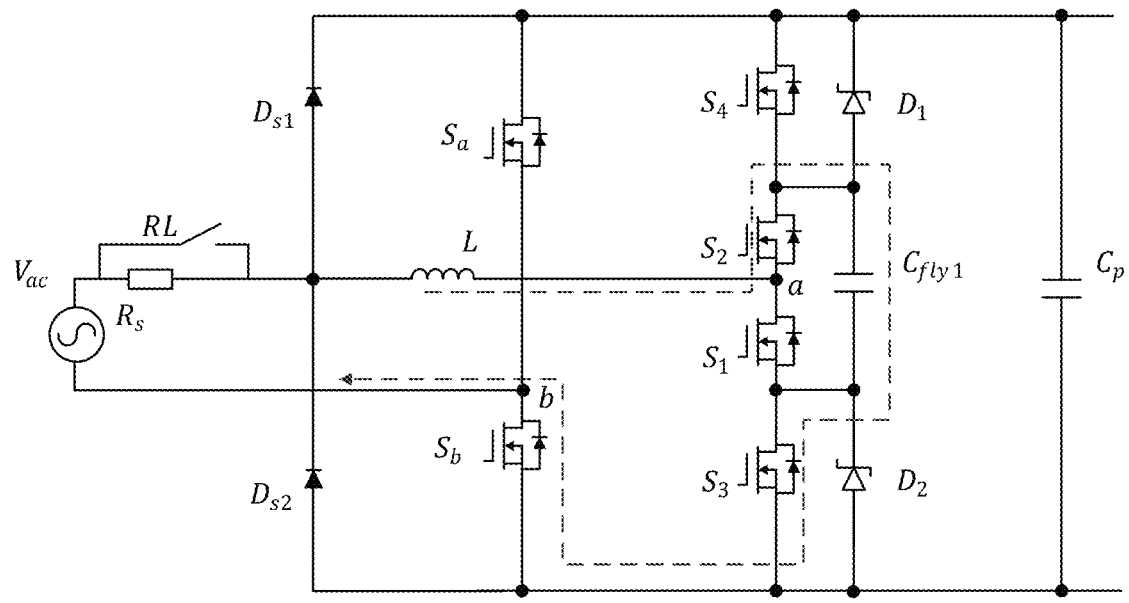
FIGS. 3A and 3B are schematic views of charging loops (as shown by dashed lines) within positive and negative half periods formed after a controller begins to operate, and when the controller controls actions of switches to form the charging loops for charging in the embodiment of FIG. 1.
Figure 3B:
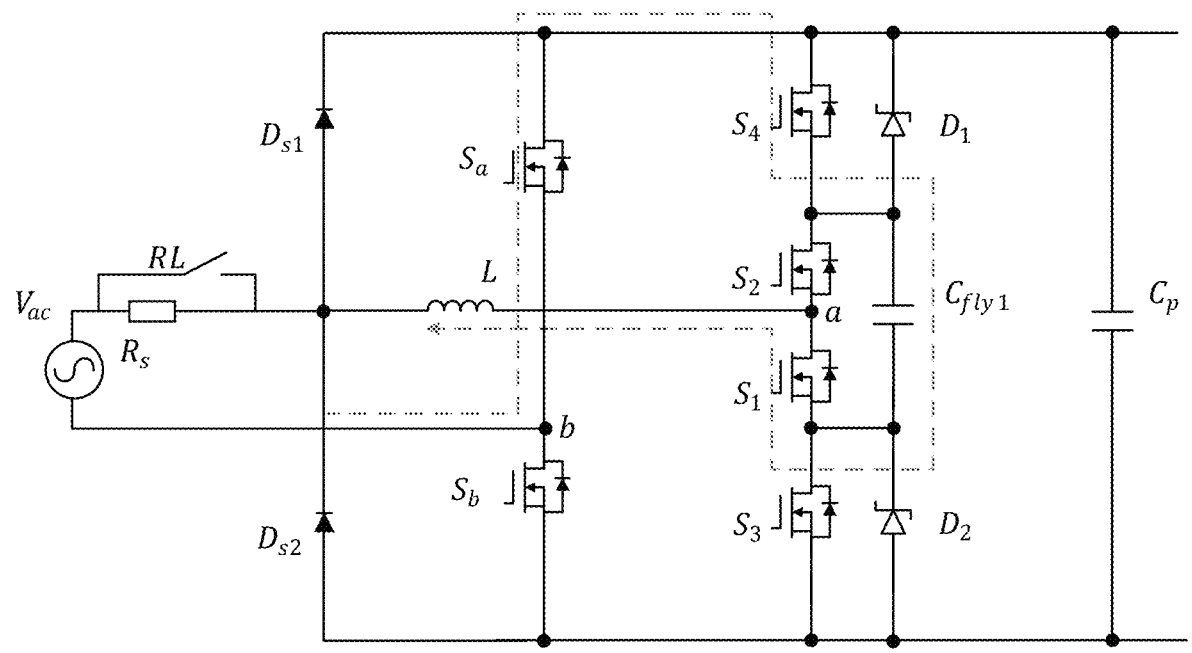

As shown in FIG. 1, it illustrates a circuit topology of a multilevel conversion circuit 100 having a flying capacitor according to one embodiment of the invention. FIGS. 2A and 2B illustrate schematic views of a charging loop (as shown by a dashed line) of a DC bus capacitor within positive and negative half periods formed after a multilevel conversion circuit is powered on, and a charging loop (as shown by a double line) of the flying capacitor within positive and negative half periods formed before a controller begins to operate, when a voltage $V_{ab}$ is higher than clamping voltages of voltage regulation diodes in the embodiment of FIG. 1. FIGS. 3A and 3B are schematic views of charging loops (as shown by dashed lines) within positive and negative half periods formed after the controller begins to operate, and when the controller controls actions of switches to form the charging loops for charging in the embodiment of FIG. 1. It shall be noted that in the embodiment of FIG. 1, a three-level conversion circuit is taken as an example, the three-level conversion circuit can be a Power Factor Correction (PFC) circuit, but the disclosure is not limited thereto. In the disclosure, the multilevel conversion circuit 100 may include a first bridge arm 10, a second bridge arm 20, a DC bus capacitor 30, a first voltage clamping module 40 and a second voltage clamping module 50. The DC bus capacitor 30 can include a single capacitor $C_p$ or a plurality of capacitors, which depends on requirements. The first bridge arm 10 may include a plurality of switches 11 connected in series, and the switches 11 may be controllable switches, diodes, or controllable switches with anti-paralleled diode. The second bridge arm 20 may include a plurality of switches 21 connected in series and a flying capacitor group 22. In this embodiment, the switches 21 may include controllable switches and anti-paralleled diodes. The controllable switch and the diode are two separate components, or the controllable switch and the diode can be integrated as one component, or the diode is a body diode of the controllable switch. A midpoint a of the second bridge arm 20 and a midpoint b of the first bridge arm 10 are connected to a power supply $V_{ac}$ and an inductor L to form a series branch 102. The first bridge arm 10 and the second bridge arm 20 are connected in parallel to the DC bus capacitor $C_p$. The first voltage clamping module 40 is disposed between a first end of the flying capacitor group 22 and a first end of the DC bus capacitor $C_p$. The second voltage clamping module 50 is disposed between a second end of the flying capacitor group 22 and a second end of the DC bus capacitor $C_p$.

In the embodiment of FIG. 1, the first bridge arm 10 includes a switch $S_a$ and a switch $S_b$ connected in series, and the switches $S_a$ and $S_b$ can be low operation frequency switches. The second bridge arm 20 includes a first switch $S_4$, a second switch $S_2$, a third switch $S_1$ and a fourth switch $S_3$ connected in series, and the switches $S_1$ to $S_4$ can be high operation frequency switches, such as, Si, GaN or SiC MOSFET. The flying capacitor group 22 includes a flying capacitor $C_{fly1}$. The first voltage clamping module 40 includes a first voltage clamping unit 41, such as, a voltage regulation diode $D_1$, connected between a first end of the flying capacitor $C_{fly1}$ and a first end of the DC bus capacitor $C_p$. The second voltage clamping module 50 includes a second voltage clamping unit 51, such as, a voltage regulation diode $D_2$, connected between a second end of the flying capacitor $C_{fly1}$ and a second end of the DC bus capacitor $C_p$. In some embodiments, the first voltage clamping unit 41 is configured to clamp a voltage across the first switch $S_4$, thereby preventing damage of the first switch $S_4$ due to overvoltage, and the second voltage clamping unit 51 is configured to clamp a voltage across the fourth switch $S_3$, thereby preventing damage of the fourth switch $S_3$ due to overvoltage.

As shown in FIG. 1, the multilevel conversion circuit 100 may further include an auxiliary power supply 60 and a controller (not shown). The auxiliary power supply 60 may be connected to the DC bus capacitor $C_p$ for powering the controller, and the controller may be coupled to the auxiliary power supply 60 and the plurality of switches 21 of the second bridge arm 20. Further, the controller is coupled to the switches $S_1$ to $S_4$ of the second bridge arm 20 for controlling the switches $S_1$ to $S_4$ to turn on or turn off. When the switches 11 include controllable switches, the controller may be further configured to turn on or turn off the plurality of switches 11. For example, the controller may further control the switches $S_a$ and $S_b$ of the first bridge arm to turn on or turn off.

In some embodiments, the controller is configured to control the corresponding controllable switches of the first bridge arm and the second bridge arm to turn on or turn off. In some embodiments, before the controller is started, the power supply charges the flying capacitor and the DC bus capacitor through the corresponding diodes of the first bridge arm and the second bridge arm.

As shown in FIGS. 1, 2A and 2B, after the multilevel conversion circuit 100 is powered on, the power supply $V_{ac}$ may charge the DC bus capacitor $C_p$ through the corresponding switches 11 of the first bridge arm 10 and the corresponding switches 21 of the second bridge arm 20. In detail, when the multilevel conversion circuit 100 is powered on and the power supply $V_{ac}$ operates in a positive half period, the power supply $V_{ac}$ may charge the DC bus capacitor $C_p$ through the switches $S_2$ and $S_4$ and the switch $S_b$. Likewise, when the multilevel conversion circuit 100 is powered on and the power supply $V_{ac}$ operates in a negative half period, the power supply $V_{ac}$ may charge the DC bus capacitor $C_p$ through the switches $S_1$ and $S_3$ and the switch $S_a$.

As shown in FIGS. 1, 2A and 2B, the multilevel conversion circuit 100 may further include a third bridge arm 80. The third bridge arm 80 may include a plurality of switches 81 connected in series, such as, diodes $D_{s1}$ and $D_{s2}$ shown in the embodiment of FIG. 1. A midpoint of the third bridge arm 80 is connected to the power supply $V_{ac}$ and the inductor L. In such way, after the multilevel conversion circuit 100 is powered on, the power supply $V_{ac}$ may charge the DC bus capacitor $C_p$ through the corresponding switches 11 of the first bridge arm 10 and the corresponding switches 21 of the second bridge arm 20. Alternatively, the power supply $V_{ac}$ may charge the DC bus capacitor $C_p$ through the corresponding switches 81 of the third bridge arm 80 and the corresponding switches 11 of the first bridge arm 10. In some embodiments, when the multilevel conversion circuit 100 is powered on and the power supply $V_{ac}$ operates in the positive half period, the power supply $V_{ac}$, the inductor L, the switches $S_2$ and $S_4$, the switch $S_b$ and the DC bus capacitor $C_p$ form a charging loop, i.e., the power supply $V_{ac}$ may charge the DC bus capacitor $C_p$ through the inductor L, the switches $S_2$ and $S_4$ and the switch $S_b$. Alternatively, the power supply $V_{ac}$, the diode $D_{s1}$, the switch $S_b$ and the DC bus capacitor $C_p$ may form a charging loop, i.e., the power supply $V_{ac}$ charges the DC bus capacitor $C_p$ through the diode $D_{s1}$ and the switch $S_b$. When the multilevel conversion circuit 100 is powered on and the power supply $V_{ac}$ operates in the negative half period, the power supply $V_{ac}$, the inductor L, the switches $S_1$ and $S_3$, the switch $S_a$ and the DC bus capacitor $C_p$ form a charging loop, i.e., the power supply $V_{ac}$ may charge the DC bus capacitor $C_p$ through the inductor L, the switches $S_1$ and $S_3$ and the switch $S_a$. Alternatively, the power supply $V_{ac}$, the diode $D_{s2}$, the switch $S_a$ and the DC bus capacitor $C_p$ also may form a charging loop, i.e., the power supply $V_{ac}$ also may charge the DC bus capacitor $C_p$ through the diode $D_{s2}$ and the switch $S_a$. It can be understood that in this embodiment, after the multilevel conversion circuit 100 is powered on, selection of the charging loop is associated with a voltage drop of the charging loop. For example, if a voltage drop on the diodes $D_{s1}$ and $D_{s2}$ is 2V, and a voltage drop on the diodes in the switches is 0.7V, after the multilevel conversion circuit 100 is powered on, a charging loop is selected by the corresponding switches of the first bridge arm 10 and the corresponding switches of the second bridge arm 20. When GaN device is used as the switches of the second bridge arm 20, since a voltage drop of the equivalent body diodes of the GaN device is associated with a current flowing the same, and after the multilevel conversion circuit 100 is powered on, a charging loop is selected by the corresponding switches of the first bridge arm 10 and the corresponding switches of the third bridge arm 80.

As shown in FIGS. 1, 2A and 2B, when the multilevel conversion circuit 100 is powered on and a voltage between the midpoint b of the first bridge arm 10 and the midpoint a of the second bridge arm 20 is greater than a clamping voltage of the first voltage clamping module 40 or the second voltage clamping module 50, the power supply $V_{ac}$ may charge the flying capacitor group 22 (e.g., the flying capacitor $C_{fly1}$) through the corresponding switches 21 of the second bridge arm 20, the first voltage clamping module 40 or the second voltage clamping module 50, and the corresponding switches 11 of the first bridge arm 10. In this embodiment, when the multilevel conversion circuit 100 is powered on and the power supply $V_{ac}$ operates in the positive half period, if the voltage between the midpoint a of the second bridge arm 20 and the midpoint b of the first bridge arm 10 is greater than the clamping voltage of the second voltage clamping module 50, such as the clamping voltage of the voltage regulation diode $D_2$, the power supply $V_{ac}$, the inductor L, the switch $S_2$, the flying capacitor $C_{fly1}$, the voltage regulation diode $D_2$ and the switch $S_b$ form a charging loop, i.e., the power supply $V_{ac}$ charges the flying capacitor $C_{fly1}$ through the inductor L, the switch $S_2$, the voltage regulation diode $D_2$ and the switch $S_b$. In this embodiment, when the multilevel conversion circuit 100 is powered on and the power supply $V_{ac}$ operates in the negative half period, if the voltage between the midpoint b of the first bridge arm 10 and the midpoint a of the second bridge arm 20 is greater than the clamping voltage of the first voltage clamping module 40, such as the clamping voltage of the voltage regulation diode $D_1$, the power supply $V_{ac}$, the inductor L, the switch $S_1$, the flying capacitor $C_{fly1}$, the voltage regulation diode $D_1$ and the switch $S_a$ form a charging loop, i.e., the power supply $V_{ac}$ charges the flying capacitor $C_{fly1}$ through the inductor L, the switch $S_1$, the voltage regulation diode $D_1$ and the switch $S_a$.

As shown in FIGS. 1, 3A and 3B, when the DC bus capacitor $C_p$ is charged and the charged voltage reaches a preset value of starting voltage, the auxiliary power supply 60 is started for powering the controller. When the charged voltage of the DC bus capacitor $C_p$ reaches a preset value of operating voltage, the controller begins to operate and control the corresponding switches 21 of the second bridge arm 20 to turn on, and the power supply $V_{ac}$ may charge the flying capacitor group 22 (e.g., the flying capacitor $C_{fly1}$) through the corresponding switches 11 of the first bridge arm 10 and the corresponding switches 21 of the second bridge arm 20. In this embodiment, when the power supply $V_{ac}$ operates in the positive half period, the controller controls the switch $S_3$ to turn on, and controls the switches $S_2$ and/or $S_b$ to turn off, and the power supply $V_{ac}$, the inductor L, the switch $S_2$, the flying capacitor $C_{fly1}$, the switch $S_3$ and the switch $S_b$ form a charging loop, i.e., the power supply $V_{ac}$ charges the flying capacitor $C_{fly1}$ through the inductor L, the switch $S_2$, the switch $S_3$ and the switch $S_b$. In other embodiments, when the power supply $V_{ac}$ operates in the positive half period, the controller controls the switches $S_3$, $S_2$ and $S_b$ to turn on. When the power supply $V_{ac}$ operates in the negative half period, the controller controls the switch $S_4$ to turn on, and controls the switches $S_1$ and/or $S_a$ to turn off, and the power supply $V_{ac}$, the inductor L, the switch $S_4$, the flying capacitor $C_{fly1}$, the switch $S_1$ and the switch $S_a$ form a charging loop, i.e., the power supply $V_{ac}$ charges the flying capacitor Cfly through the inductor L, the switch $S_4$, the switch $S_1$ and the switch $S_a$. In other embodiments, when the power supply $V_{ac}$ operates in the negative half period, the controller controls the switches $S_4$, $S_1$ and $S_a$ to turn on.

In some embodiments, the power supply $V_{ac}$ may charge the flying capacitor group 22 (e.g., the flying capacitor $C_{fly1}$) through the corresponding switches 11 of the first bridge arm 10, the corresponding switches 21 of the second bridge arm 20 and the corresponding switches 81 of the third bridge arm 80. When the power supply $V_{ac}$ operates in the positive half period, the controller controls the switches $S_4$ and $S_3$ to turn on, and the power supply $V_{ac}$, the switch $D_{s1}$, the switch $S_4$, the flying capacitor $C_{fly1}$, the switch $S_3$ and the switch $S_b$ form a charging loop, i.e., the power supply $V_{ac}$ charges the flying capacitor $C_{fly1}$ through the switch $D_{s1}$, the switch $S_4$, the switch $S_3$ and the switch $S_b$. When the power supply $V_{ac}$ operates in the negative half period, the controller controls the switches $S_4$ and $S_3$ to turn on, and the power supply $V_{ac}$, the switch $D_{s2}$, the switch $S_4$, the flying capacitor $C_{fly1}$, the switch $S_3$ and the switch $S_a$ form a charging loop, i.e., the power supply $V_{ac}$ charges the flying capacitor Cfly through the switch $D_{s2}$, the switch $S_4$, the switch $S_3$ and the switch $S_a$.

In some embodiments, the preset value of starting voltage may be different from the preset value of operating voltage. For example, the preset value of starting voltage is less than the preset value of operating voltage. When the auxiliary power supply 60 is started, and the controller also can make response, but the controller does not operate immediately.

As shown in FIG. 1, the multilevel conversion circuit 100 may further include a current limiting circuit 71 connected in series to the series branch 102. The current limiting circuit 71, for example, may include a current limiting resistor $R_s$ and a switch RL connected in parallel.

Figure 12:
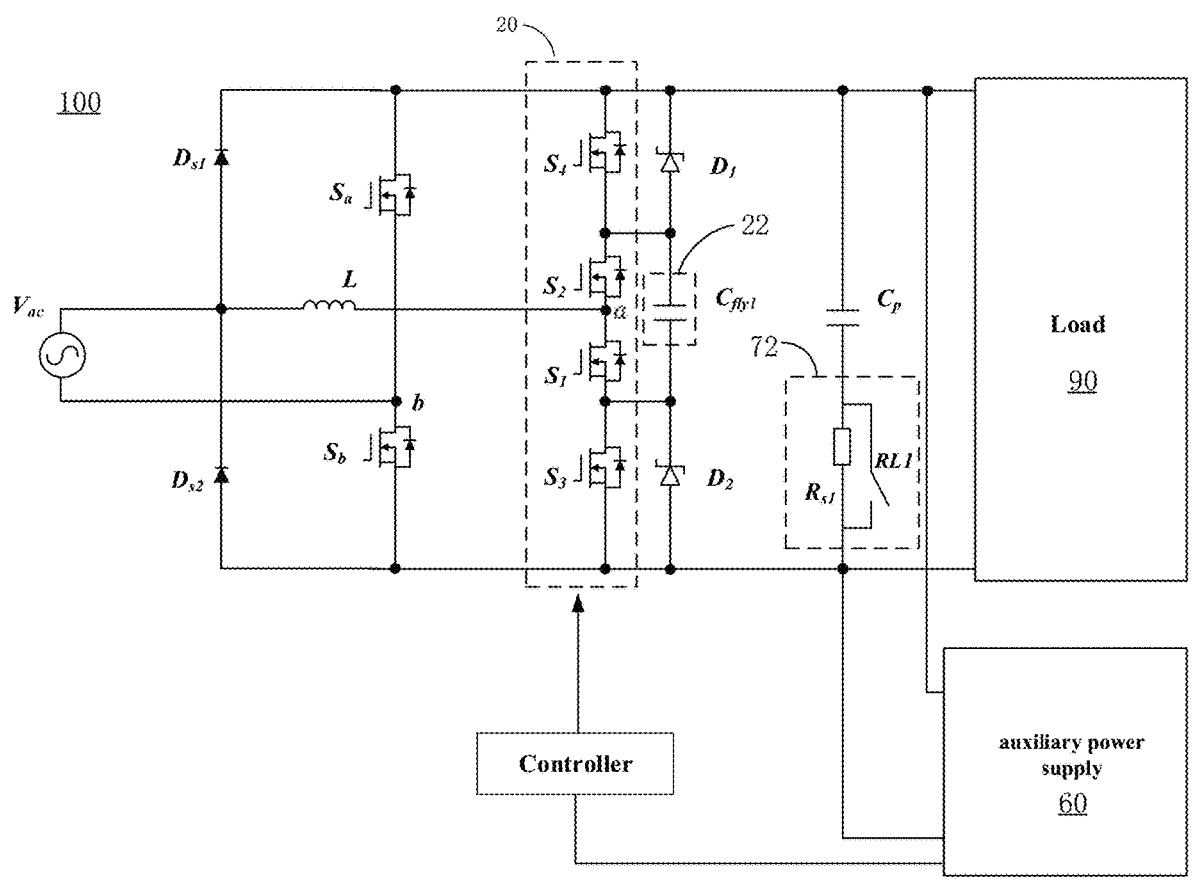
FIG. 12 is a three-level conversion circuit having a flying capacitor according to another embodiment of the invention.

As shown in FIG. 12, it illustrates a circuit of a multilevel conversion circuit having a flying capacitor according to another embodiment of the invention. The multilevel conversion circuit 100 may further include a current limiting circuit 72 connected in series to the DC bus capacitor $C_p$. The current limiting circuit 72, for example, may include a current limiting resistor $R_{s1}$ and a switch RL1 connected in parallel.

As shown in FIGS. 1 and 12, before the multilevel conversion circuit begins to charge the DC bus capacitor $C_p$, the switches RL and RL1 are in a turn-off state, and after the flying capacitor 22 of the multilevel conversion circuit completes charging, the controller controls the switches RL and RL1 to turn on.

As shown in FIGS. 1, 2A and 2B, after the multilevel conversion circuit 100 is powered on, when the voltage between the midpoint b of the first bridge arm 10 and the midpoint a of the second bridge arm 20 is greater than a clamping voltage of the first voltage clamping unit 41 (e.g., the voltage regulation diode $D_1$) or the second voltage clamping unit 51 (e.g., the voltage regulation diode $D_2$), the power supply $V_{ac}$ may charge the flying capacitor Cfly through the corresponding switches 21 of the second bridge arm 20, the first voltage clamping unit 41 or the second voltage clamping unit 51, and the corresponding switches 11 of the first bridge arm 10.

When a voltage of the DC bus capacitor $C_p$ reaches a preset value of operating voltage, a voltage of the flying capacitor $C_{fly1}$ is selected from the maximum value among a difference between the preset value of operating voltage and the clamping voltage of the first voltage clamping unit 41 (e.g., the voltage regulation diode $D_1$), a difference between the preset value of operating voltage and the clamping voltage of the second voltage clamping unit 51 (e.g., the voltage regulation diode $D_2$), and zero.

When a voltage of the DC bus capacitor $C_p$ reaches a preset value of starting voltage, the auxiliary power supply 60 is started for powering the controller. When a voltage of the DC bus capacitor $C_p$ reaches a preset value of operating voltage, the controller operates and controls the corresponding switches 21 of the second bridge arm 20 to turn on, and the power supply $V_{ac}$ may charge the flying capacitor $C_{fly1}$ through the corresponding switches 11 of the first bridge arm 10 and the corresponding switches 21 of the second bridge arm 20. Alternatively, the power supply $V_{ac}$ may charge the flying capacitor $C_{fly1}$ through the corresponding switches 11 of the first bridge arm 10, the corresponding switches 21 of the second bridge arm 20 and the corresponding switches 81 of the third bridge arm 80. When a voltage of the flying capacitor $C_{fly1}$ reaches a half of the preset value of operating voltage, the controller controls all switches 21 of the second bridge arm 20 to turn off, and the flying capacitor $C_{fly1}$ completes charging.

When a voltage of the DC bus capacitor $C_p$ is less than a voltage of the flying capacitor $C_{fly1}$, the flying capacitor $C_{fly1}$ may be discharged through the first voltage clamping unit 41 (e.g., the voltage regulation diode $D_1$) or the second voltage clamping unit 51 (e.g., the voltage regulation diode $D_2$). Alternatively, the flying capacitor $C_{fly1}$ may be discharged through the first switch $S_4$ and the fourth switch $S_3$.

Hereinafter the principle of the disclosure is described and explained in details with reference to the three-level conversion circuit and a method for pre-charging the same shown in FIG. 1.

As shown in FIGS. 1, 2A and 2B, the three-level conversion circuit having a flying capacitor is illustrated. After the conversion circuit is powered on, the DC bus capacitor $C_p$ is charged by the power supply $V_{ac}$ through the switches (e.g., the diodes $D_{s1}$ and $D_{s2}$) of the third bridge arm 80, the corresponding switches 11 of the first bridge arm 10 and the corresponding switches 21 of the second bridge arm 20, and a DC bus voltage is established for powering the auxiliary power supply 60.

Before the controller begins to operate, if an input voltage $V_{ab}$ is higher than clamping voltages of the voltage clamping units (e.g., the voltage regulation diodes $D_1$ and $D_2$), charging loops of the flying capacitor within positive and negative half periods shown by double lines in FIGS. 2A and 2B are formed. When the power supply $V_{ac}$ operates in the positive half period, the power supply $V_{ac}$ charges the flying capacitor $C_{fly1}$ through the current limiting resistor $R_s$, the inductor L, the switch $S_2$, the switch $S_3$ and the switch $S_b$, and when the power supply $V_{ac}$ operates in the negative half period, the power supply $V_{ac}$ charges the flying capacitor $C_{fly1}$ through the current limiting resistor $R_s$, the inductor L, the switch $S_a$, the switch $S_4$ and the switch $S_1$. When the power supply $V_{ac}$ operates in the positive and negative half periods, a voltage $V_{Cfly1}$ of the flying capacitor $C_{fly1}$ is shown by formulas (1) and (2):

Positive half period: $V_{Cfly1}=V_{ab}-V_{D2}$ (if $V_{ab}>V_{D2}$)

$$V_{Cfly1}=0 \text{ (if } V_{ab}<=V_{D2}) \quad (1)$$

Negative half period: $V_{Cfly1}=V_{ab}-V_{D1}$ (if $V_{ab}>V_{D1}$)

$$V_{Cfly1}=0 \text{ (if } V_{ab}<=V_{D1}) \quad (2)$$

wherein $V_{Cfly1}$ is a voltage of the flying capacitor $C_{fly1}$, $V_{ab}$ is a voltage between the midpoint a of the second bridge arm 20 and the midpoint b of the first bridge arm 10, $V_{D2}$ is a clamping voltage of the second voltage clamping unit 51, and $V_{D1}$ is a clamping voltage of the first voltage clamping unit 41.

In this process, a voltage $V_{Cp}$ of the DC bus capacitor $C_p$ is stabilized at the preset value of operating voltage. For example, the voltage is a peak value $V_{ab\_peak}$ of the voltage $V_{ab}$ between the midpoint a of the second bridge arm 20 and the midpoint b of the first bridge arm 10, and the voltage $V_{Cfly1}$ of the flying capacitor $C_{fly1}$ is stabilized at the maximum value selected from a difference ($V_{ab\_peak}-V_{D2}$) between the preset value of operating voltage and the clamping voltage of the second voltage clamping unit 51, a difference ($V_{ab\_peak}-V_{D1}$) between the preset value of operating voltage and the clamping voltage of the second voltage clamping unit 41, and zero.

As the voltage $V_{Cp}$ of the DC bus capacitor $C_p$ is stabilized, the controller is started to operate, and controls the corresponding switches to form charging loops, and the charging loops within positive and negative half periods are shown by dashed lines in FIGS. 3A and 3B. Generally, the clamping voltages $V_D$ of the voltage clamping units (e.g., the voltage regulation diodes $D_1$ and $D_2$) shall be slightly less than the breakdown voltage $V_{BRDSS}$ of the switches in the second bridge arm 20, so when the controller is started, and controls the switch $S_4$ located at an outer side of the flying capacitor $C_{fly1}$ to turn on, the switch $S_3$ may be not damaged due to overvoltage. Likewise, when the controller controls the switch $S_3$ located at an outer side of the flying capacitor $C_{fly1}$ to turn on, the switch $S_4$ may be not damaged due to overvoltage.

As shown in FIG. 3A, when the power supply $V_{ac}$ operates in the positive half period, the switches $S_b$, $S_2$ and $S_3$ form a charging loop of the flying capacitor $C_{fly1}$, the controller controls the switch $S_3$ to turn on, and the power supply $V_{ac}$ charges the flying capacitor $C_{fly1}$ through the current limiting resistor $R_s$, the inductor L, the switch $S_2$, the switch $S_3$ and the switches $S_b$. At this time, $V_{S4}+V_{Cfly1}=V_{Cp}$, and $V_{Cp}$ is a voltage of the DC bus capacitor, and $V_{S4}$ is a voltage across the switch $S_4$. If there is no voltage regulation diode $D_1$, then $V_{S4}$ is equal to $V_{Cp}$, which may exceed a breakdown voltage of the switch $S_4$, causing damage to the switch $S_4$. Therefore, the switch $S_4$ may be avoided from breakdown by arranging the voltage regulation diode $D_1$ parallel to the switch $S_4$. When the voltage $V_{ab}$ between the midpoint b of the first bridge arm and the midpoint a of the second bridge arm is greater than the clamping voltages $V_{D1}$ and $V_{D2}$ of the voltage regulation diodes $D_1$ and $D_2$, the voltage $V_{Cfly1}$ of the flying capacitor $C_{fly1}$ is the larger one of ($V_{ab}-V_{D1}$) and ($V_{ab}-V_{D2}$). The switch $S_4$ may be avoided from breakdown through the flying capacitor $C_{fly1}$ and the voltage regulation diode $D_1$.

As shown in FIG. 3B, when the power supply $V_{ac}$ operates in the negative half period, the switches $S_a$, $S_1$ and $S_4$ form a charging loop of the flying capacitor $C_{fly1}$, the controller controls the switch $S_4$ to turn on, and the power supply $V_{ac}$ charges the flying capacitor $C_{fly1}$ through the switch $S_a$, the switch $S_4$, the switch $S_1$, the inductor L and the current limiting resistor $R_s$. At this time, $V_{S3}+V_{Cfly1}=V_{Cp}$, and $V_{S3}$ is a voltage across the switch $S_3$. If there is no voltage regulation diode $D_2$, then $V_{S3}$ is equal to $V_{Cp}$, which may exceed a breakdown voltage of the switch $S_3$, causing damage to the switch $S_3$. Therefore, the switch $S_3$ may be avoided from breakdown by arranging the voltage regulation diode $D_2$ parallel to the switch $S_3$. When the voltage $V_{ab}$ between the midpoint b of the first bridge arm and the midpoint a of the second bridge arm is greater than the clamping voltages $V_{D1}$ and $V_{D2}$ of the voltage regulation diodes $D_1$ and $D_2$, the voltage $V_{Cfly1}$ of the flying capacitor Cfly is the larger one of ($V_{ab}-V_{D1}$) and ($V_{ab}-V_{D2}$). The switch $S_3$ may be avoided from breakdown through the flying capacitor Cfly and the voltage regulation diode $D_2$.

In this embodiment, when the voltage $V_{Cfly1}$ of the flying capacitor $C_{fly1}$ reaches a voltage $V_{Cp}/2$ of the DC bus capacitor $C_p$, all switches are turned off, and pre-charging of the flying capacitor $C_{fly1}$ is completed.

In this embodiment, after the multilevel conversion circuit is powered off, since the diodes have a forward conduction voltage drop, the voltage $V_{Cp}$ of the DC bus capacitor $C_p$ is decreased till it is less than the voltage $V_{Cfly1}$ of the flying capacitor $C_{fly1}$. At this time, the flying capacitor $C_{fly1}$ is discharged through the voltage clamping units connected in series to both sides of the flying capacitor $C_{fly1}$.

In other embodiments, the voltage $V_{Cp}$ of the DC bus capacitor $C_p$ is decreased till it is less than the voltage $V_{Cfly1}$ of the flying capacitor $C_{fly1}$. At this time, the flying capacitor $C_{fly1}$ is discharged through the switch $S_4$ and the switch $S_3$.

In other embodiments, the voltage $V_{Cp}$ of the DC bus capacitor $C_p$ is decreased till it is less than the voltage $V_{Cfly1}$ of the flying capacitor $C_{fly1}$. At this time, the flying capacitor Cfly is discharged through the voltage clamping modules connected in series to both sides of the flying capacitor $C_{fly1}$ as well as the switch $S_4$ and the switch $S_3$.

Figure 13:
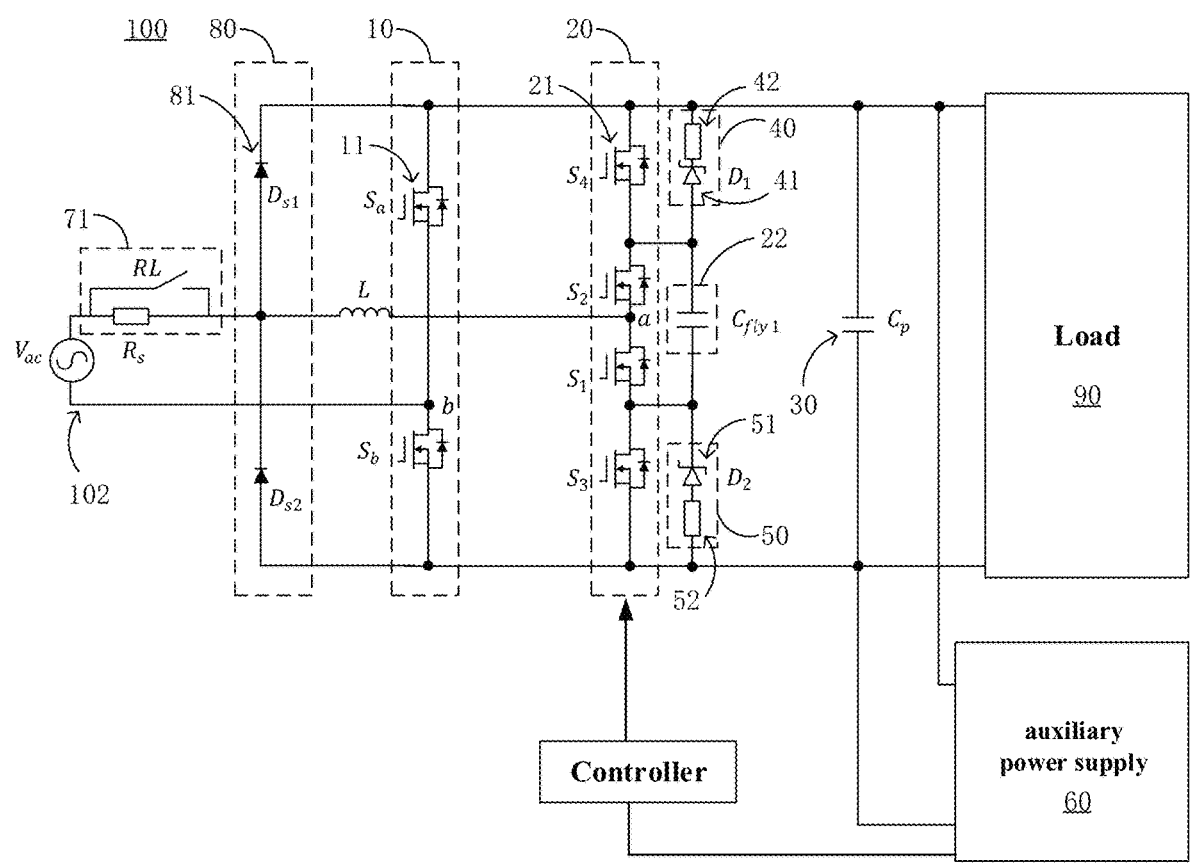
FIG. 13 is a three-level conversion circuit having a flying capacitor according to another embodiment of the invention.
Figures 14, 15:
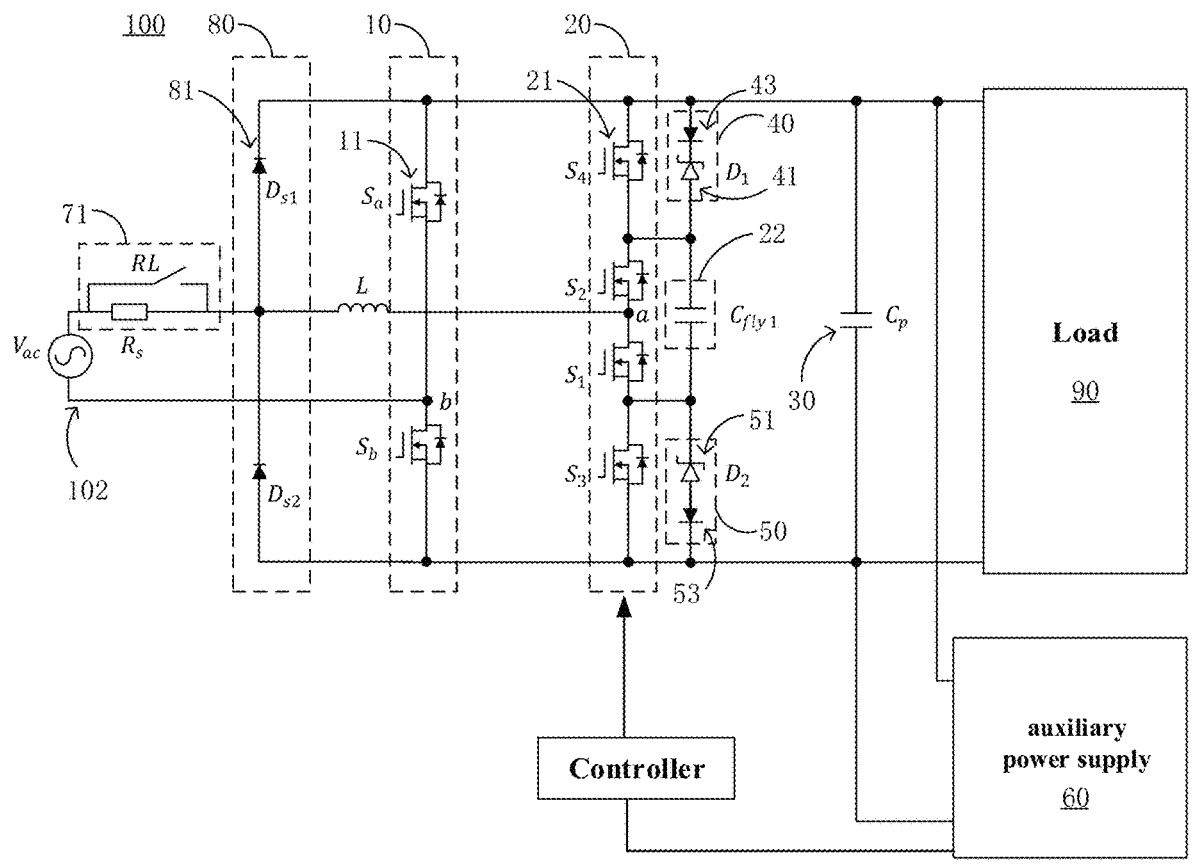
FIG. 14 is a three-level conversion circuit having a flying capacitor according to another embodiment of the invention.
FIG. 15 is a flow chart of a method for pre-charging a multilevel conversion circuit having a flying capacitor according to the present disclosure.

As shown in FIGS. 13 and 14, FIG. 13 is a three-level conversion circuit having a flying capacitor according to another embodiment of the invention, and FIG. 14 is a three-level conversion circuit having a flying capacitor according to another embodiment of the invention. The three-level conversion circuit having a flying capacitor shown in FIG. 13 differs from the three-level conversion circuit having a flying capacitor shown in FIG. 1 in that the first voltage clamping module 40 includes a first voltage clamping unit 41 and a first impedance circuit 42, and the second voltage clamping module 50 includes a second voltage clamping unit 51 and a second impedance circuit 52. The first voltage clamping unit 41 may be a voltage regulation diode $D_1$, the second voltage clamping unit 51 may be a voltage regulation diode $D_2$, the first impedance circuit 42 may be, but not limited to a resistor, and the second impedance circuit 52 may be, but not limited to a resistor. The first voltage clamping unit 41 is connected in series to the first impedance circuit 42, and the second voltage clamping unit 51 is connected in series to the second impedance circuit 52. When the switches of the second bridge arm 20 use high operation frequency switches, such as GaN, since a backward conduction voltage drop is much higher than that of silicon switches, after the first voltage clamping unit 41 and the second voltage clamping unit 51 are added, the first voltage clamping unit 41 and the second voltage clamping unit 51 are conducted at a freewheeling stage, and a reverse recovery current will seriously affect normal operation of the multilevel conversion circuit. The reverse recovery current of the first voltage clamping unit 41 and the second voltage clamping unit 51 is limited by adding the first impedance circuit 42 into the first voltage clamping module 40 and adding the second impedance circuit 52 into the second voltage clamping module 50, thereby preventing normal operation of the multilevel conversion circuit from being affected.

As shown in FIG. 14, the topology of the three-level conversion circuit having a flying capacitor differs from the topology of the three-level conversion circuit having a flying capacitor shown in FIG. 1 in that the first voltage clamping module 40 includes a first voltage clamping unit 41 and a first diode 43, and the second voltage clamping module 50 includes a second voltage clamping unit 51 and a second diode 53. The first voltage clamping unit 41 may be a voltage regulation diode $D_1$, the second voltage clamping unit 51 may be a voltage regulation diode $D_2$. A forward conduction direction of the first diode 43 is opposite to a forward conduction direction of the first voltage clamping unit 41, and a forward conduction direction of the second diode 53 is opposite to a forward conduction direction of the second voltage clamping unit 51. In this embodiment, the forward conduction direction of the first diode 43 is opposite to a forward conduction direction of the voltage regulation diode $D_1$, and the forward conduction direction of the second diode 53 is opposite to a forward conduction direction of the voltage regulation diode $D_2$, thereby ensuring that the voltage regulation diodes $D_1$ and $D_2$ are only turned on during a clamping operation and turned off during the other operations, and preventing normal operation of the multilevel conversion circuit from being affected.

Figure 4:
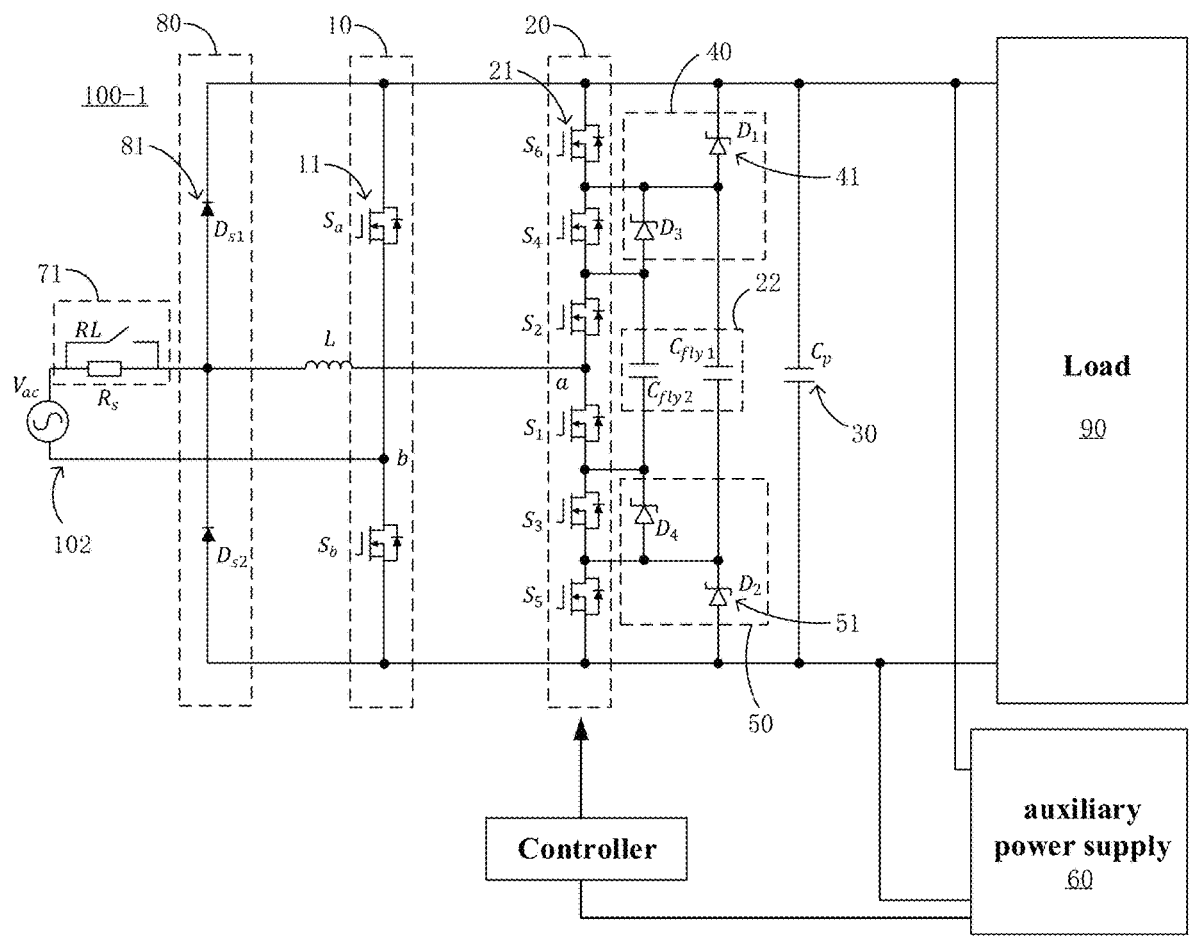
FIG. 4 is a topology of a four-level conversion circuit having a flying capacitor according to a second embodiment of the invention.
Figure 8:
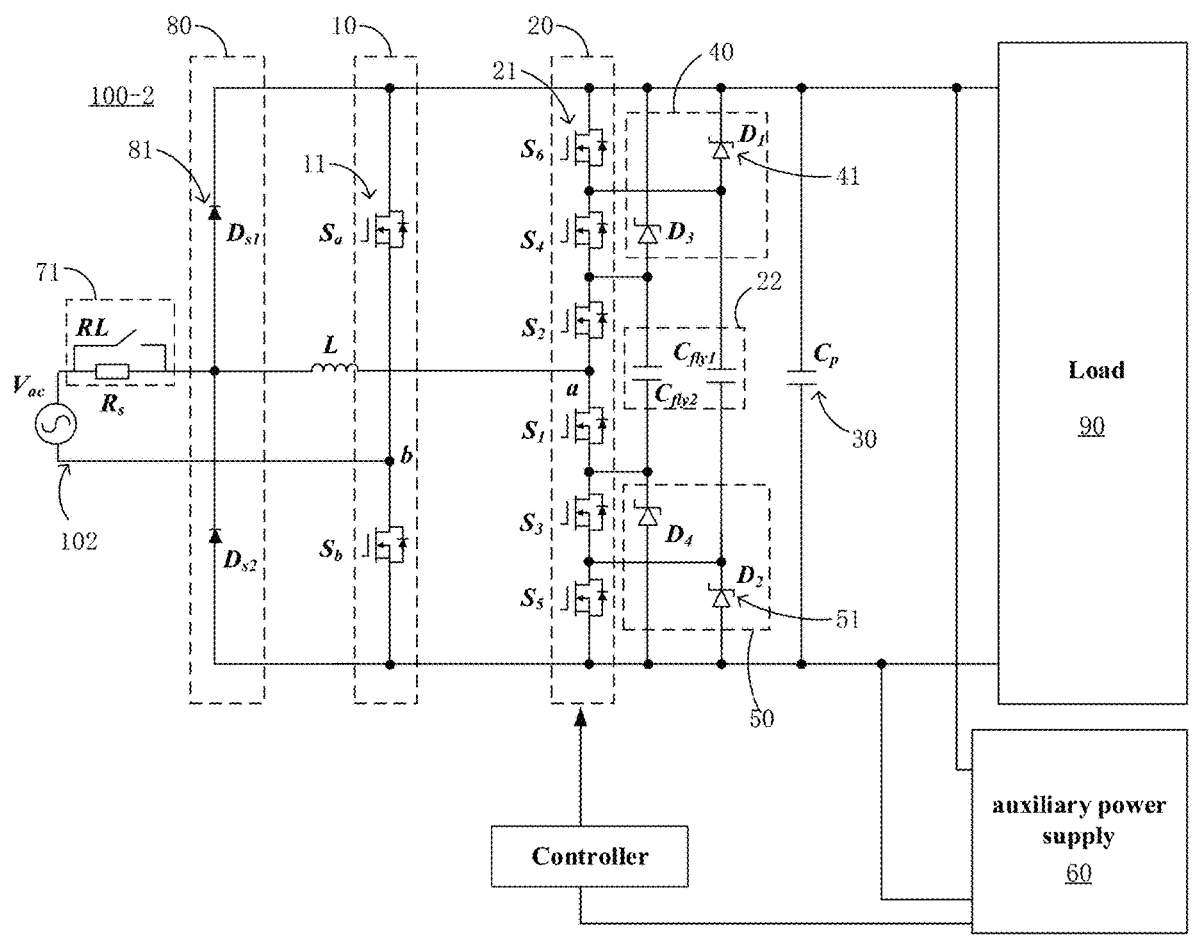
FIG. 8 is an alternative embodiment according to FIG. 4.
Figure 9:
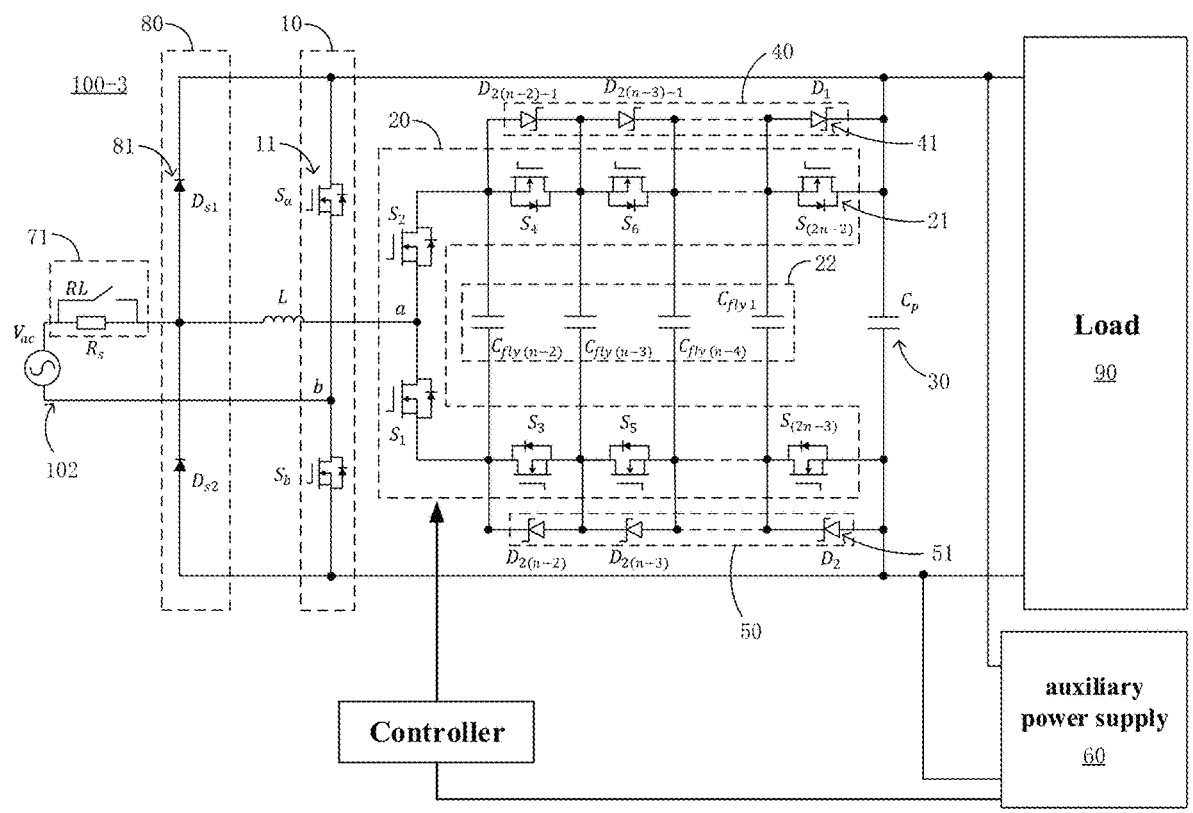
FIG. 9 is a n-level conversion circuit having a flying capacitor according to a third embodiment of the invention.
Figure 11:
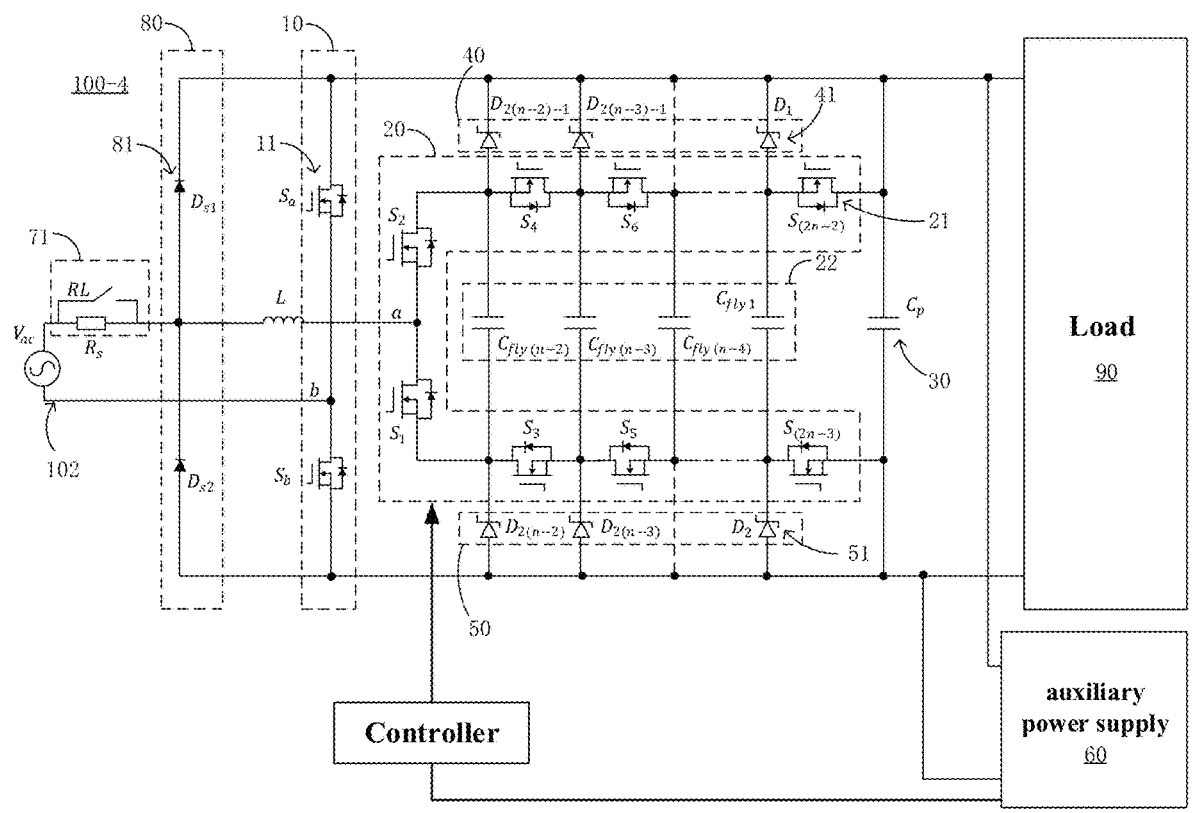
FIG. 11 is an alternative embodiment according to FIG. 9.

In some embodiments, the multilevel conversion circuit 100 may be a n-level conversion circuit, where n is a natural number greater than 3, for example, a four-level conversion circuit (as shown in FIGS. 4 and 8), or a multilevel conversion circuit (as shown in FIGS. 9 and 11).

Compared to FIG. 1, the second bridge arm 20 of the n-level conversion circuit may include (2n−2) switches 21 connected in series, and the flying capacitor group 22 may include (n−2) flying capacitors. The i-th flying capacitor is disposed between the i-th switch and the (2n−1−i)th switch of the second bridge arm 20, where i is 1, 2, 3, 4, . . . , and n-2, and n is a natural number greater than 3. Moreover, the first voltage clamping module 40 may include (n−2) first voltage clamping units 41, the 1st first voltage clamping unit 41 is connected between a first end of the first flying capacitor and the first end of the DC bus capacitor $C_p$, and the j-th first voltage clamping unit 41 is connected between a first end of the j-th flying capacitor and a first end of the (j−1)th flying capacitor. The second voltage clamping module 50 may include (n−2) second voltage clamping units 51, the 1st second voltage clamping unit 51 is connected between a second end of the first flying capacitor and the second end of the DC bus capacitor $C_p$, and the j-th second voltage clamping unit 51 is connected between a second end of the j-th flying capacitor and a second end of the (j−1)th flying capacitor, where j is 2, 3, 4, . . . , and n−2.

Taking a four-level PFC circuit 100-1 shown in FIG. 4 for example, the second bridge arm 20 may include six switches connected in series, for example, a first switch $S_6$, a second switch $S_4$, a third switch $S_2$, a fourth switch $S_1$, a fifth switch $S_3$ and a sixth switch S5. The flying capacitor group 22 may include two flying capacitors, for example, flying capacitors $C_{fly1}$ and $C_{fly2}$. The first flying capacitor $C_{fly1}$ is disposed between the first switch $S_6$ and the sixth switch $S_5$, and the second flying capacitor $C_{fly2}$ is disposed between the second switch $S_4$ and the fifth switch $S_3$. The first voltage clamping module 40 may include two first voltage clamping units 41, for example, voltage regulation diodes $D_1$ and $D_3$. The voltage regulation diode $D_1$ is connected between a first end of the first flying capacitor $C_{fly1}$ and the first end of the DC bus capacitor $C_p$, and the voltage regulation diode $D_3$ is connected between a first end of the second flying capacitor $C_{fly2}$ and the first end of the first flying capacitor $C_{fly1}$. The second voltage clamping module 50 may include two second voltage clamping units 51, for example, voltage regulation diodes $D_2$ and $D_4$. The voltage regulation diode $D_2$ is connected between a second end of the first flying capacitor Cfly and the second end of the DC bus capacitor $C_p$, and the voltage regulation diode $D_4$ is connected between a second end of the second flying capacitor $C_{fly2}$ and the second end of the first flying capacitor $C_{fly1}$.

When the n-level conversion circuit is powered on and the voltage between the midpoint b of the first bridge arm 10 and the midpoint a of the second bridge arm 20 is greater than a sum of clamping voltages of the 1st to i-th first voltage clamping units 41, the power supply $V_{ac}$ may charge the i-th flying capacitor $C_{fly1}$ through the corresponding switches 21 of the second bridge arm 20, the 1st to i-th first voltage clamping units 41, and the corresponding switches 11 of the first bridge arm 10. Alternatively, when the n-level conversion circuit is powered on and the voltage between the midpoint b of the first bridge arm 10 and the midpoint a of the second bridge arm 20 is greater than a sum of clamping voltages of the 1st to i-th second voltage clamping units 51, the power supply $V_{ac}$ may charge the i-th flying capacitor $C_{flyi}$ through the corresponding switches 21 of the second bridge arm 20, the 1st to i-th second voltage clamping units 51, and the corresponding switches 11 of the first bridge arm 10.

In some embodiments, when the voltage of the DC bus capacitor $C_p$ reaches a preset value of starting voltage, the auxiliary power supply 60 is started. When the voltage of the DC bus capacitor $C_p$ reaches a preset value of operating voltage, the controller operates and controls the corresponding switches 21 of the second bridge arm 20 to turn on, and the power supply $V_{ac}$ may charge the (n−2) flying capacitors through the corresponding switches 11 of the first bridge arm 10 and the corresponding switches 21 of the second bridge arm 20. In other embodiments, the power supply $V_{ac}$ may charge the (n−2) flying capacitors through the corresponding switches 11 of the first bridge arm 10, the corresponding switches 21 of the second bridge arm 20 and the corresponding switches 81 of the third bridge arm 80.

When a voltage of the i-th flying capacitor reaches (n−1−i)/(n−1) times of the preset value of operating voltage, the controller controls the corresponding switches 21 of the second bridge arm 20 to turn off, and after the (n−2) flying capacitors complete charging, the controller controls all switches 21 of the second bridge arm 20 to turn off.

When a voltage of the i-th flying capacitor is less than a voltage of the (i+1)th flying capacitor, the (i+1)th flying capacitor is discharged through the (i+1)th first voltage clamping unit 41 and the (i+1)th second voltage clamping unit 51, and/or discharged through the (i+1)th switch 21 and the (2n−2−i)th switch 21. In some embodiments, when the voltage of the DC bus capacitor $C_p$ is less than the voltage of the first flying capacitor, the first flying capacitor is discharged through the 1st first voltage clamping unit 41 and the 1st second voltage clamping unit 51, and/or discharged through the first switch 21 and the (2n−2)th switch 21.

Taking the four-level conversion circuit 100-1 shown in FIG. 4 for example, when the voltage of the first flying capacitor $C_{fly1}$ is less than the voltage of the second flying capacitor $C_{fly2}$, the second flying capacitor $C_{fly2}$ may be discharged through the voltage regulation diode $D_3$ and the voltage regulation diode $D_4$, and/or discharged through the switch $S_4$ and the switch $S_3$. When the voltage of the DC bus capacitor $C_p$ is less than the voltage of the first flying capacitor $C_{fly1}$, the first flying capacitor Cfly may be discharged through the voltage regulation diode $D_1$ and the voltage regulation diode $D_2$, and/or discharged through the switch $S_6$ and the switch $S_5$.

Hereinafter the principle of the disclosure is described and explained in details with reference to the four-level conversion circuit and a method for pre-charging the same shown in FIGS. 4 to 7B.

Figure 5A:
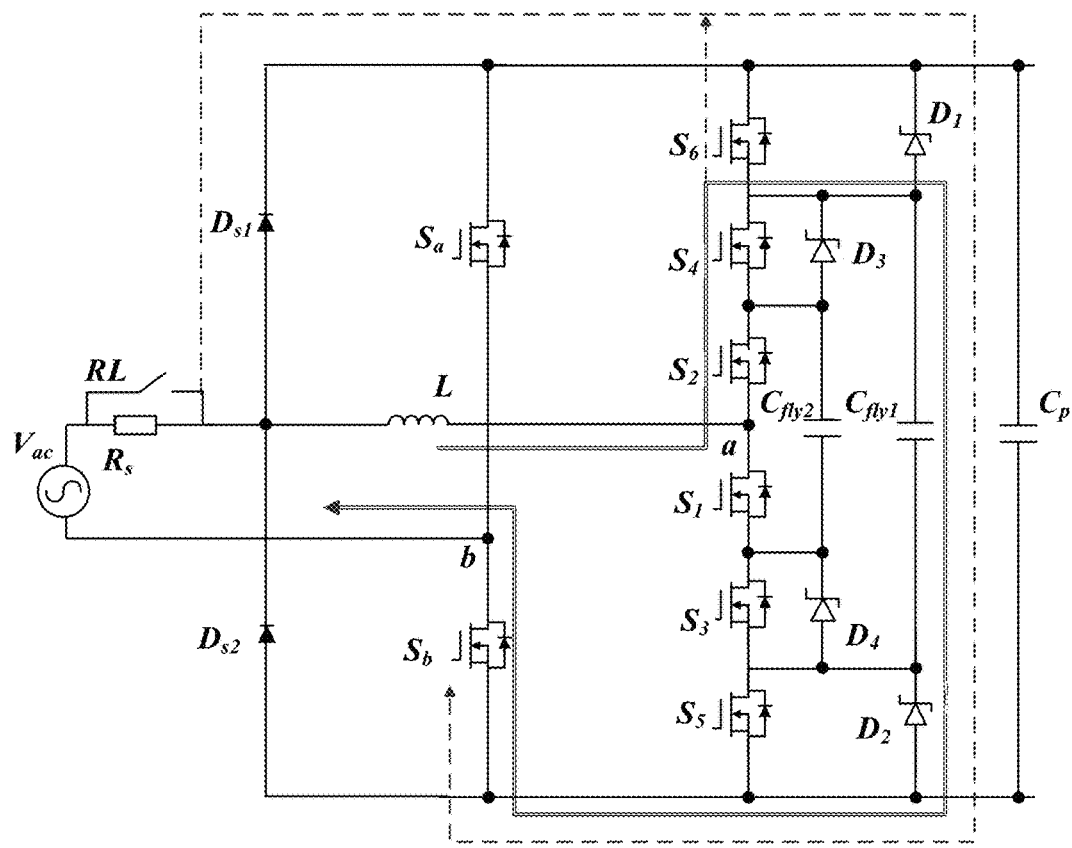
FIGS. 5A and 5B are schematic views of charging loops (as shown by double lines) of the flying capacitor within positive and negative half periods formed before a controller begins to operate, when a voltage $V_{ab}$ is higher than a clamping voltage of a voltage regulation diode $D_1$ or $D_2$ in the embodiment of FIG. 4.
Figure 5B:
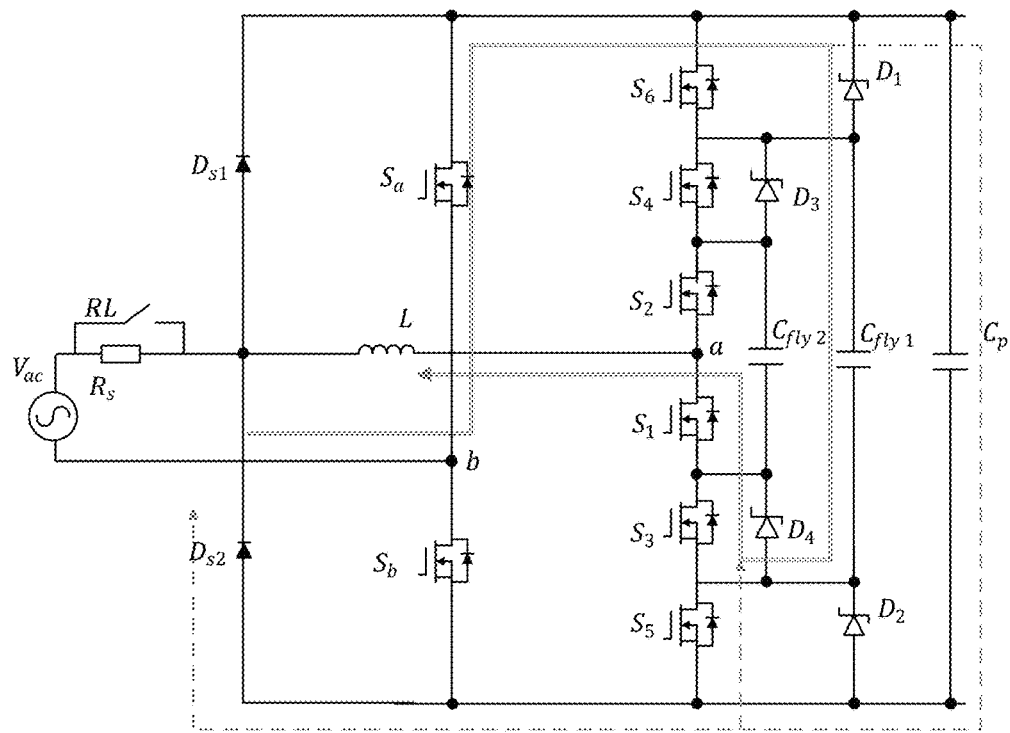

As shown in FIGS. 4, 5A and 5B, they illustrate a four-level conversion circuit 100-1 having a flying capacitor according to one embodiment of the invention. In some embodiments, when the four-level conversion circuit is powered on, and the power supply $V_{ac}$ operates in a positive half period, the DC bus capacitor $C_p$ is charged by the power supply $V_{ac}$ through the switches $S_2$, $S_4$ and $S_6$ and the switch $S_b$. Alternatively, the DC bus capacitor $C_p$ is charged by the power supply $V_{ac}$ through the switch $D_{s1}$ and the switch $S_b$. In some embodiments, when the four-level conversion circuit is powered on, and the power supply $V_{ac}$ operates in a negative half period, the DC bus capacitor $C_p$ is charged by the power supply $V_{ac}$ through the switches $S_1$, $S_3$ and $S_5$ and the switch $S_a$. Alternatively, the DC bus capacitor $C_p$ is charged by the power supply $V_{ac}$ through the switch $D_{s2}$ and the switch $S_a$. When the DC bus capacitor $C_p$ is charged to a certain voltage, a DC bus voltage is established for powering the auxiliary power supply 60.

Before the controller begins to operate, if an input voltage $V_{ab}$ is higher than a clamping voltage of the voltage regulation diode $D_1$ or $D_2$, charging loops of the flying capacitor within positive and negative half periods shown by double lines in FIGS. 5A and 5B are formed. When the power supply $V_{ac}$ operates in the positive half period, the power supply $V_{ac}$ may charge the flying capacitor $C_{fly1}$ through the current limiting resistor $R_s$, the inductor L, the switches $S_2$ and $S_4$, the voltage regulation diode $D_2$ and the switch $S_b$. When the power supply $V_{ac}$ operates in the negative half period, the power supply $V_{ac}$ may charge the flying capacitor $C_{fly1}$ through the current limiting resistor $R_s$, the inductor L, the switches $S_1$ and $S_3$, the voltage regulation diode $D_1$ and the switch $S_a$. A voltage $V_{Cfly1}$ of the flying capacitor Cfly is shown by formulas (3) and (4):

Positive half period: $V_{Cfly1} = V_{ab} - V_{D2}$ (if $V_{ab} > V_{D2}$)

$V_{Cfly1} = 0$ (if $V_{ab} <= V_{D2}$) \hfill (3)

Negative half period: $V_{Cfly1} = V_{ab} - V_{D1}$ (if $V_{ab} > V_{D1}$)

$V_{Cfly1} = 0$ (if $V_{ab} <= V_{D1}$) \hfill (4)

wherein $V_{Cfly1}$ is a voltage of the flying capacitor $C_{fly1}$, $V_{ab}$ is a voltage between the midpoint a of the second bridge arm 20 and the midpoint b of the first bridge arm 10, $V_{D2}$ is a clamping voltage of the voltage regulation diode $D_2$, and $V_{D1}$ is a clamping voltage of the voltage regulation diode $D_1$.

Figure 6A:
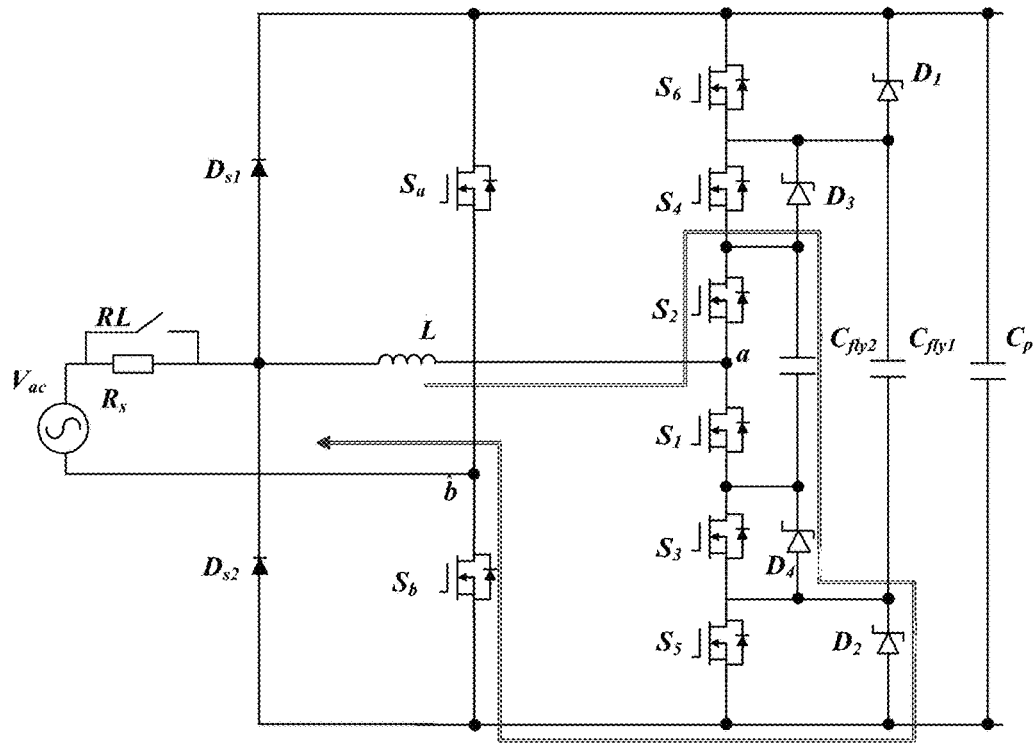
FIGS. 6A and 6B are schematic views of charging loops (as shown by double lines) within positive and negative half periods formed when a voltage $V_{ab}$ is higher than a sum of clamping voltages of voltage regulation diodes $D_1$ and $D_3$ or $D_2$ and $D_4$ in the embodiment of FIG. 4.
Figure 6B:
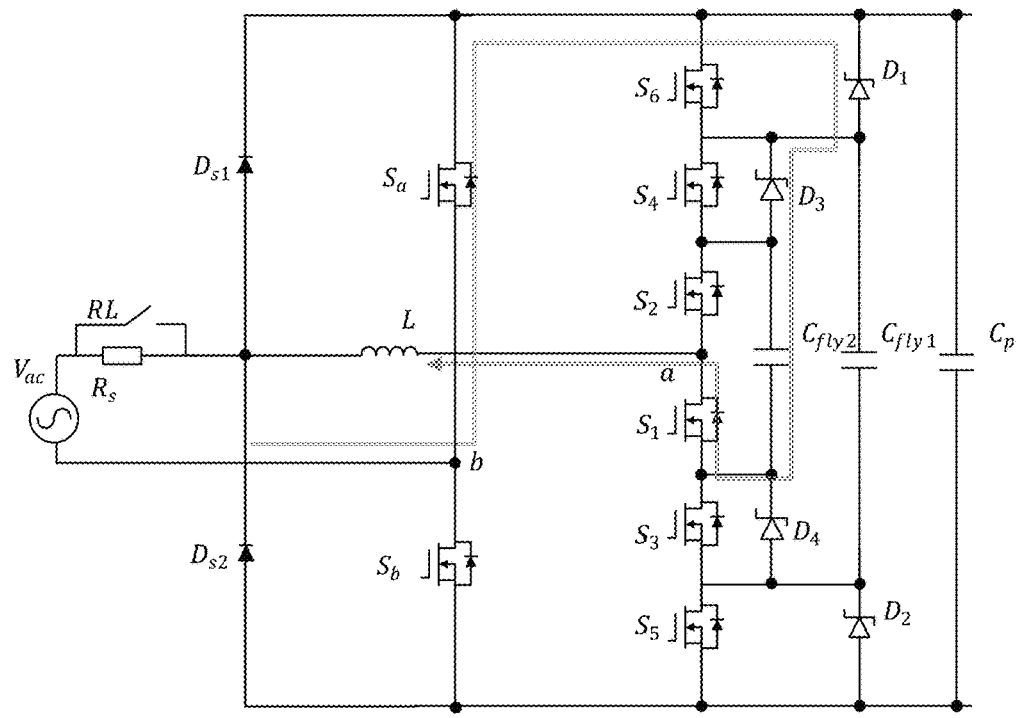

If the voltage $V_{ab}$ is greater than a sum of clamping voltages of the voltage regulation diodes $D_1$ and $D_3$, or a sum of clamping voltages of the voltage regulation diodes $D_2$ and $D_4$, charging loops of the flying capacitor within positive and negative half periods shown by double lines in FIGS. 6A and 6B are formed.

When the power supply $V_{ac}$ operates in the positive half period, the power supply $V_{ac}$ may charge the flying capacitor $C_{fly2}$ through the current limiting resistor $R_s$, the inductor L, the switch $S_2$, the voltage regulation diodes $D_4$ and $D_2$, and the switch $S_b$. When the power supply $V_{ac}$ operates in the negative half period, the power supply $V_{ac}$ may charge the flying capacitor $C_{fly2}$ through the current limiting resistor $R_s$, the inductor L, the switch $S_1$, the voltage regulation diodes $D_1$ and $D_3$, and the switch $S_a$. A voltage $V_{Cfly2}$ of the flying capacitor $C_{fly2}$ is shown by formulas (5) and (6):

Positive half period: $V_{Cfly2} = V_{ab} - V_{D2} - V_{D4}$ (if $V_{ab} > V_{D2} + V_{D4}$)

$V_{Cfly2} = 0$ (if $V_{ab} <= V_{D2} + V_{D4}$) \hfill (5)

Negative half period: $V_{Cfly2} = V_{ab} - V_{D1} - V_{D3}$ (if $V_{ab} > V_{D1} + V_{D3}$)

$V_{Cfly2} = 0$ (if $V_{ab} <= V_{D1} + V_{D3}$) \hfill (6)

wherein $V_{Cfly2}$ is a voltage of the flying capacitor $C_{fly2}$, $V_{ab}$ is a voltage between the midpoint a of the second bridge arm 20 and the midpoint b of the first bridge arm 10, $V_{D2}$ is a clamping voltage of the voltage regulation diode $D_2$, $V_{D1}$ is a clamping voltage of the voltage regulation diode $D_1$, $V_{D3}$ is a clamping voltage of the voltage regulation diode $D_3$, $V_{D4}$ is a clamping voltage of the voltage regulation diode $D_4$.

In this process, a voltage $V_{Cp}$ of the DC bus capacitor $C_p$ is stabilized at the preset value of operating voltage $V_{ab\_peak}$, the voltage $V_{Cfly1}$ of the flying capacitor $C_{fly1}$ is stabilized at the maximum value among $(V_{ab\_peak} - V_{D2})$, $(V_{ab\_peak} - V_{D1})$ and zero, and the voltage $V_{Cfly2}$ of the flying capacitor $C_{fly2}$ is stabilized at the maximum value among $(V_{ab\_peak} - V_{D2} - V_{D4})$, $(V_{ab\_peak} - V_{D1} - V_{D3})$ and zero.

As the voltage of the DC bus capacitor reaches the preset value of starting voltage, the auxiliary power supply 60 is started. When the voltage of the DC bus capacitor is stabilized at the preset value of operating voltage, the controller begins to operate, and control the corresponding switches to form charging loops for charging the flying capacitors $C_{fly1}$ and $C_{fly2}$, and the charging loops within positive and negative half periods are shown by dashed lines in FIGS. 7A and 7B.

Figure 7A:
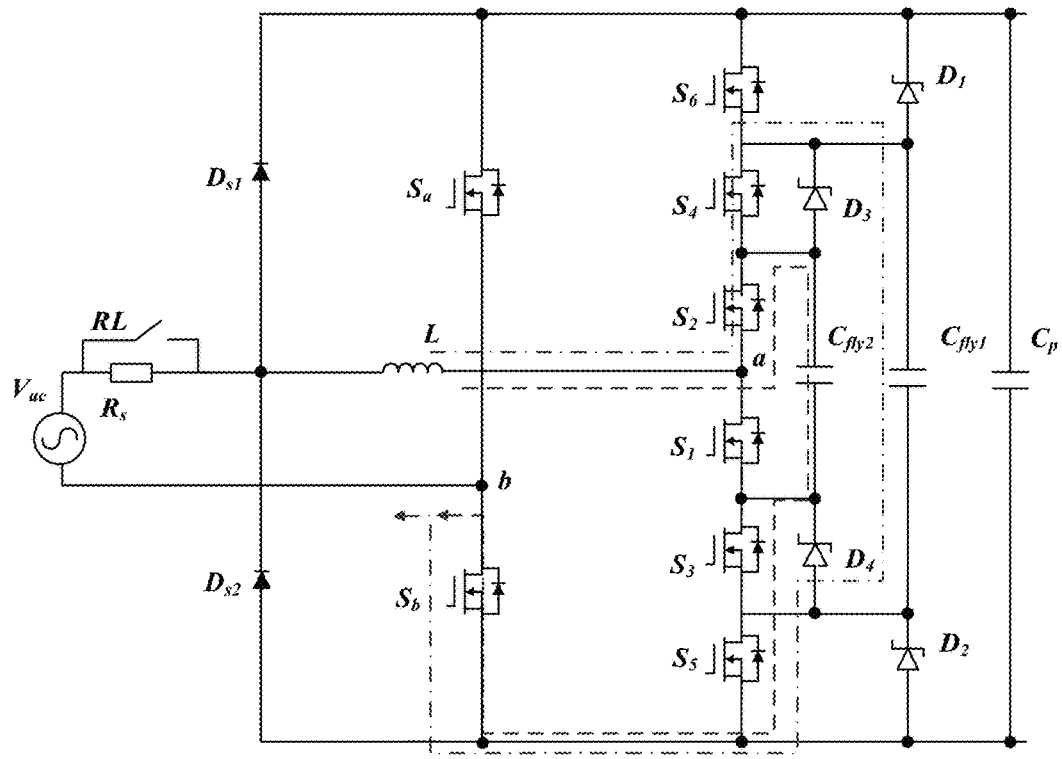
FIGS. 7A and 7B are schematic views of charging loops (as shown by dashed lines) within positive and negative half periods formed after a controller begins to operate, when the controller controls actions of switches to form the charging loops for charging in the embodiment of FIG. 4.

As shown in FIG. 7A, when the power supply $V_{ac}$ operates in the positive half period, the switches $S_b$ and $S_2$, and the switches $S_3$ and $S_5$ form a charging loop of the flying capacitor $C_{fly2}$, and the power supply $V_{ac}$ charges the flying capacitor $C_{fly2}$ through the current limiting resistor $R_s$, the inductor L, the switch $S_2$, the switch $S_3$, the switch $S_5$ and the switch $S_b$. At this time, $V_{S4} + V_{Cfly2} - V_{Cfly1}$, wherein $V_{S4}$ is a voltage across the switch $S_4$. If there is no voltage regulation diode $D_3$, then $V_{S4}$ is equal to $V_{Cfly1}$, which may exceed a breakdown voltage of the switch $S_4$, causing damage to the switch $S_4$. Therefore, the switch $S_4$ may be avoided from breakdown through the voltage regulation diode $D_3$. When the voltage $V_{ab}$ between the midpoint b of the first bridge arm and the midpoint a of the second bridge arm is greater than a sum of the clamping voltages $V_{D2}$ and $V_{D4}$ of the voltage regulation diodes $D_2$ and $D_4$, and a sum of the clamping voltages $V_{D1}$ and $V_{D3}$ of the voltage regulation diodes $D_1$ and $D_3$, the voltage of the flying capacitor $C_{fly2}$ is the larger one of $(V_{ab}-V_{D2}-V_{D4})$ and $(V_{ab}-V_{D1}-V_{D3})$, and the switch $S_4$ may be avoided from breakdown through the flying capacitor $C_{fly2}$ and the voltage regulation diode $D_3$.

The switches $S_b$, $S_2$ and $S_4$ and the switch $S_5$ form a charging loop of the flying capacitor $C_{fly1}$, and the power supply $V_{ac}$ charges the flying capacitor $C_{fly1}$ through the current limiting resistor $R_s$, the inductor L, the switch $S_2$, the switch $S_4$, the switch $S_5$ and the switch $S_b$. At this time, $V_{S6}+V_{Cfly1}=V_{Cp}$, wherein $V_{S6}$ is a voltage across the switch $S_6$, and $V_{Cp}$ is a voltage of the DC bus capacitor $C_p$. If there is no voltage regulation diode $D_1$, then $V_{S6}$ is equal to $V_{Cp}$, which may exceed a breakdown voltage of the switch $S_6$, causing damage to the switch $S_6$. Therefore, the switch $S_6$ may be avoided from breakdown through the voltage regulation diode $D_1$. When the voltage $V_{ab}$ between the midpoint b of the first bridge arm and the midpoint a of the second bridge arm is greater than the clamping voltages $V_{D1}$ and $V_{D2}$ of the voltage regulation diodes $D_1$ and $D_2$, the voltage of the flying capacitor $C_{fly1}$ is the larger one of $(V_{ab}-V_{D2})$ and $(V_{ab}-V_{D1})$, and the switch $S_6$ may be avoided from breakdown through the flying capacitor $C_{fly1}$ and the voltage regulation diode $D_1$.

In other embodiments, the diode $D_{s1}$, the switches $S_6$ and $S_5$, the flying capacitor $C_{fly1}$ and the switches $S_b$ form a charging loop, and the power supply $V_{ac}$ charges the flying capacitor $C_{fly1}$ through the resistor $R_s$, the diode $D_{s1}$, the switches $S_6$ and $S_5$ and the switches $S_b$. The power supply $V_{ac}$ charges the flying capacitor $C_{fly2}$ through the resistor $R_s$, the diode $D_{s1}$, the switches $S_6$, $S_4$, $S_3$ and $S_5$ and the switch $S_b$.

Figure 7B:
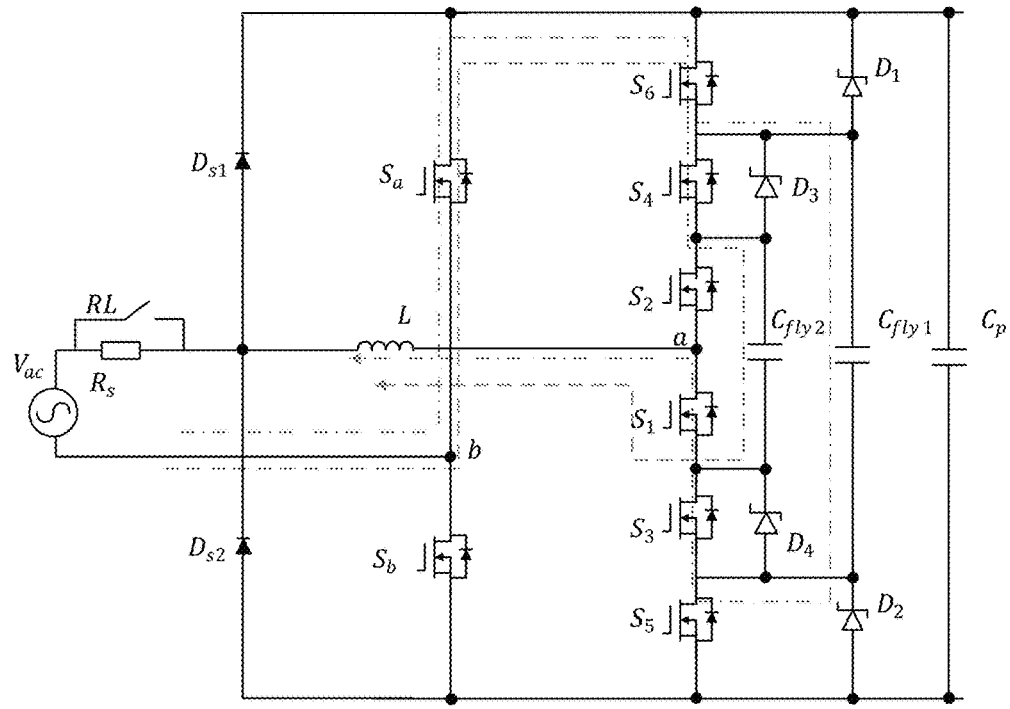

As shown in FIG. 7B, when the power supply $V_{ac}$ operates in the negative half period, the switches $S_a$ and $S_1$, and the switches $S_4$ and $S_6$ form a charging loop of the flying capacitor $C_{fly2}$, and the power supply $V_{ac}$ charges the flying capacitor $C_{fly2}$ through the switch $S_a$, the switch $S_6$, the switch $S_4$, the switch $S_1$, the inductor L and the current limiting resistor $R_s$. At this time, $V_{S3}+V_{Cfly2}=V_{Cfly1}$, wherein $V_{S3}$ is a voltage across the switch $S_3$. If there is no voltage regulation diode $D_4$, then $V_{S3}$ is equal to $V_{Cfly1}$, which may exceed a breakdown voltage of the switch $S_3$, causing damage to the switch $S_3$. Therefore, the switch $S_3$ may be avoided from breakdown through the voltage regulation diode $D_4$. When the voltage $V_{ab}$ between the midpoint b of the first bridge arm and the midpoint a of the second bridge arm is greater than a sum of the clamping voltages $V_{D2}$ and $V_{D4}$ of the voltage regulation diodes $D_2$ and $D_4$, and a sum of the clamping voltages $V_{D1}$ and $V_{D3}$ of the voltage regulation diodes $D_1$ and $D_3$, the voltage of the flying capacitor $C_{fly2}$ is the larger one of $(V_{ab}-V_{D2}-V_{D4})$ and $(V_{ab}-V_{D1}-V_{D3})$, and the switch $S_3$ may be avoided from breakdown through the flying capacitor $C_{fly2}$ and the voltage regulation diode $D_4$.

The switches $S_a$, $S_1$ and $S_3$ and the switch $S_6$ form a charging loop of the flying capacitor $C_{fly1}$, and the power supply $V_{ac}$ charges the flying capacitor $C_{fly1}$ through the switch $S_a$, the switch $S_6$, the switch $S_3$, the switch $S_1$, the inductor L and the current limiting resistor $R_s$. At this time, $V_{S5}+V_{Cfly1}=V_{Cp}$, wherein $V_{S5}$ is a voltage across the switch $S_5$, and $V_{Cp}$ is a voltage of the DC bus capacitor $C_p$. If there is no voltage regulation diode $D_2$, then $V_{S5}$ is equal to $V_{Cp}$, which may exceed a breakdown voltage of the switch $S_5$, causing damage to the switch $S_5$. Therefore, the switch $S_5$ may be avoided from breakdown through the voltage regulation diode $D_2$. When the voltage $V_{ab}$ between the midpoint b of the first bridge arm and the midpoint a of the second bridge arm is greater than the clamping voltages $V_{D1}$ and $V_{D2}$ of the voltage regulation diodes $D_1$ and $D_2$, the voltage of the flying capacitor $C_{fly1}$ is the larger one between $(V_{ab}-V_{D2})$ and $(V_{ab}-V_{D1})$, and the switch $S_5$ may be avoided from breakdown through the flying capacitor $C_{fly1}$ and the voltage regulation diode $D_2$.

In other embodiments, the diode $D_{s2}$, the switches $S_6$ and $S_5$, the flying capacitor $C_{fly1}$ and the switch $S_a$ form a charging loop, and the power supply $V_{ac}$ charges the flying capacitor $C_{fly1}$ through the resistor $R_s$, the diode $D_{s2}$, the switches $S_6$ and $S_5$ and the switch $S_a$. The power supply $V_{ac}$ charges the flying capacitor $C_{fly2}$ through the resistor $R_s$, the diode $D_{s2}$, the switches $S_6$, $S_4$, $S_3$ and $S_5$ and the switch $S_a$.

When the voltage $V_{Cfly2}$ of the flying capacitor $C_{fly2}$ reaches one third of the voltage of the DC bus capacitor $C_p$ (i.e. $V_{Cp}/3$), the switches $S_3$ and $S_4$ are turned off, and pre-charging of the flying capacitor $C_{fly2}$ is completed. When the voltage $V_{Cfly1}$ of the flying capacitor Cfly reaches two third of the voltage of the DC bus capacitor $C_p$ (i.e. $2V_{Cp}/3$), the switches $S_5$ and $S_6$ are turned off, and pre-charging of the flying capacitor $C_{fly1}$ is completed. At this time, pre-charging of the flying capacitors $C_{fly1}$ and $C_{fly2}$ of the four-level PFC circuit is completed, and the controller is configured to control all switches of the second bridge arm to turn off.

It shall be noted that in operation of the four-level PFC circuit, when $V_{Cfly1}$ is always less than the clamping voltage $V_{D3}$ of the voltage regulation diode $D_3$ and the clamping voltage $V_{D4}$ of the voltage regulation diode $D_4$, protection of the voltage regulation diodes $D_3$ and $D_4$ to the switches $S_3$ and $S_4$ can be omitted. At this time, only two voltage regulation diodes, i.e., $D_1$ and $D_2$, are used. In this embodiment, the switches of the second bridge arm can select low-voltage switches. For example, when the breakdown voltage $V_{BRDSS}$ equals to 250V, the voltage clamping module can select the voltage regulation diode with a clamping voltage of 200V, and when a voltage of the power supply $V_{ac}$ is 264V, the DC bus capacitor $C_p$ is charged through the DC bus charging loops shown by dashed lines in FIGS. 5A and 5B, and a voltage peak of the DC bus capacitor $C_p$ is $264 \times \text{sqrt}(2)$. At this time, the flying capacitor $C_{fly1}$ is charged, and the voltage $V_{Cfly1}$ is about 173.4V, which is obviously less than the maximum breakdown voltage $V_{BRDSS}$ of the switches, so the voltage regulation diodes $D_3$ and $D_4$ can be omitted.

After the four-level conversion circuit is powered off, since the diodes have a forward conduction voltage drop, when the voltage $V_{Cp}$ of the DC bus capacitor $C_p$ is decreased to be less than the voltage $V_{Cfly1}$ of the flying capacitor $C_{fly1}$, the voltage regulation diodes $D_1$ and $D_2$ connected in series are turned on forwardly, and the flying capacitor $C_{fly1}$ begins to discharge through the voltage regulation diodes $D_1$ and $D_2$. In some embodiments, when the voltage $V_{Cp}$ of the DC bus capacitor $C_p$ is decreased to be less than the voltage $V_{Cfly1}$ of the flying capacitor $C_{fly1}$, the flying capacitor $C_{fly1}$ begins to discharge through the switches $S_5$ and $S_6$.

When the voltage $V_{Cfly1}$ of the flying capacitor $C_{fly1}$ is decreased to be less than the voltage $V_{Cfly2}$ of the flying capacitor $C_{fly2}$, the voltage regulation diodes $D_3$ and Da connected in series are turned on forwardly, and the flying capacitor $C_{fly2}$ begins to discharge through the voltage regulation diodes $D_3$ and $D_4$. In some embodiments, when the voltage $V_{Cfly1}$ of the flying capacitor $C_{fly1}$ is decreased to be less than the voltage $V_{Cfly2}$ of the flying capacitor $C_{fly2}$, the flying capacitor $C_{fly2}$ begins to discharge through the switches $S_4$ and $S_3$.

In other embodiments, positions of the voltage regulation diodes of the four-level conversion circuit 100-1 shown in FIG. 4 can be alternative to a structure in a four-level conversion circuit 100-2 shown in FIG. 8. At this time, the voltage regulation diodes $D_3$ and $D_4$ connected in series to the flying capacitor $C_{fly2}$ are connected to both ends of the DC bus capacitor $C_p$, i.e., the voltage regulation diode $D_3$ is connected between the flying capacitor $C_{fly2}$ and the first end of the DC bus capacitor $C_p$, and the voltage regulation diode $D_4$ is connected between the flying capacitor $C_{fly2}$ and the second end of the DC bus capacitor $C_p$. Accordingly, the voltage regulation diodes $D_1$, $D_2$ and $D_3$, $D_4$ can be in different specifications.

Before the four-level conversion circuit is powered on, and the controller begins to operate, if the voltage $V_{ab}$ between the midpoint b of the first bridge arm 10 and the midpoint a of the second bridge arm 20 is higher than the clamping voltage of the voltage regulation diode $D_3$ or $D_4$, when the power supply $V_{ac}$ operates in the positive half period, the power supply $V_{ac}$ charges the flying capacitor $C_{fly2}$ through the current limiting resistor $R_s$, the inductor L, the switch $S_2$, the voltage regulation diode $D_4$ and the switch $S_b$, and when the power supply $V_{ac}$ operates in the negative half period, the power supply $V_{ac}$ charges the flying capacitor $C_{fly2}$ through the current limiting resistor $R_s$, the switch $S_1$, the voltage regulation diode $D_3$ and the switch $S_a$. A voltage $V_{Cfly2}$ of the flying capacitor $C_{fly2}$ is shown by formulas (7) and (8):

Positive half period: $V_{Cfly2}=V_{ab}-V_{D4}$ (if $V_{ab}>V_{D4}$)

$V_{Cfly2}=0$ (if $V_{ab}<=V_{D4}$) (7)

Negative half period: $V_{Cfly2}=V_{ab}-V_{D3}$ (if $V_{ab}>V_{D3}$)

$V_{Cfly2}0$ (if $V_{ab}<=V_{D3}$) (8)

After the four-level conversion circuit is powered off, since the diodes have a forward conduction voltage drop, when the voltage $V_{Cp}$ of the DC bus capacitor is decreased to be less than the voltage $V_{Cfly1}$ of the flying capacitor $C_{fly1}$, the voltage regulation diodes $D_1$ and $D_2$ connected in series to both sides of the flying capacitor $C_{fly1}$ are turned on forwardly, and the flying capacitor $C_{fly1}$ begins to discharge through the voltage regulation diodes $D_1$ and $D_2$, or the flying capacitor $C_{fly1}$ begins to discharge through the switches $S_6$ and $S_5$. When the voltage $V_{Cfly1}$ of the flying capacitor $C_{fly1}$ is decreased to be less than the voltage $V_{Cfly2}$ of the flying capacitor $C_{fly2}$, the voltage regulation diodes $D_3$ and $D_4$ connected in series to both sides of the flying capacitor $C_{fly2}$ are turned on forwardly, and the flying capacitor $C_{fly2}$ begins to discharge through the voltage regulation diodes $D_3$ and $D_4$, or the flying capacitor $C_{fly2}$ begins to discharge through the switches $S_6$, $S_4$, $S_3$ and $S_5$.

As shown in FIG. 9, it illustrates a n-level conversion circuit 100-3 having a flying capacitor. After the n-level conversion circuit is powered on, the DC bus capacitor $C_p$ is charged by the power supply $V_{ac}$ through the diode $D_{s1}$ or $D_{s2}$ and the corresponding switches 11 of the first bridge arm 10, or charged by the power supply $V_{ac}$ through the corresponding switches 11 of the first bridge arm 10 and the corresponding switches 21 of the second bridge arm 20, and a DC bus voltage is established for powering the auxiliary power supply 60.

As for a n-level conversion circuit 100-3 having a flying capacitor, 2×(n−2) voltage regulation diodes are required in total to protect the corresponding switches, and a voltage $V_{Cflym}$ of the flying capacitor $C_{flym}$ is shown by formulas (9) and (10):

Positive Half Period:

$V_{Cflym}=V_{Cfly(m-1)}-V_{D(2m)}$ (if $V_{Cfly(m-1)}>V_{D(2m)}$)
$(m=2,3\ldots n-2)$ (9)

Negative Half Period:

$V_{Cflym}=V_{Cfly(m-1)}-V_{D(2m-1)}$ (if $V_{Cfly(m-1)}>V_{D(2m-1)}$)
$(m=2,3\ldots n-2)$ (10)

In some embodiments, if a voltage stress of the switches of the second bridge arm 20 is pre-judged not to satisfy the formulas (9) and (10) according to actual operating state, the voltage regulation diodes $D_1$ and $D_2$ can only be connected to both sides of the flying capacitor $C_{fly1}$ and both ends of the DC bus capacitor $C_p$ for protecting the switches $S_{(2n-2)}$ and $S_{(2n-3)}$ at an outer side of the flying capacitor $C_{fly1}$, and a voltage $V_{Cfly1}$ of the flying capacitor $C_{fly1}$ is shown by formulas (11) and (12):

Positive half period: $V_{Cfly1}=V_{Cp}-V_{D2}$ (if $V_{ab}>V_{D2}$)

$V_{Cfly1}=0$ (if $V_{ab}<=V_{D2}$) (11)

Negative half period: $V_{Cfly1}=V_{Cp}-V_{D1}$ (if $V_{ab}>V_{D1}$)

$V_{Cfly1}=0$ (if $V_{ab}<=V_{D1}$) (12)

In some embodiments, the number of voltage regulation diodes can be two, and at most 2×(n−2).

In some embodiments, as shown by the embodiment in FIG. 9, the first voltage clamping module 40 includes n first voltage clamping units 41 and n first impedance circuits. The first impedance circuit is connected in series to the corresponding first voltage clamping unit 41. The second voltage clamping module 50 includes n second voltage clamping units 51 and n second impedance circuits. The second impedance circuit is connected in series to the corresponding second voltage clamping unit 51. By adding the first impedance circuits and the second impedance circuits, a reverse recovery current of the first voltage clamping units 41 and the second voltage clamping units 51 is limited, thereby preventing normal operation of the multilevel conversion circuit from being affected.

In some embodiments, as shown by the embodiment in FIG. 9, the first voltage clamping module 40 includes n first voltage clamping units 41 and n first diodes. The first diode is connected in series to the corresponding first voltage clamping unit 41. The second voltage clamping module 50 includes n second voltage clamping units 51 and n second diodes. The second diode is connected in series to the corresponding second voltage clamping unit 51. A forward conduction direction of the first diode is opposite to a forward conduction direction of the corresponding first voltage clamping unit 41, and a forward conduction direction of the second diode is opposite to a forward conduction direction of the corresponding second voltage clamping unit 51. By adding the first diodes and the second diodes, the first voltage clamping units and the second voltage clamping units are only turned on during a clamping operation and turned off during the other operations, and preventing normal operation of the multilevel conversion circuit from being affected.

Figure 10A:
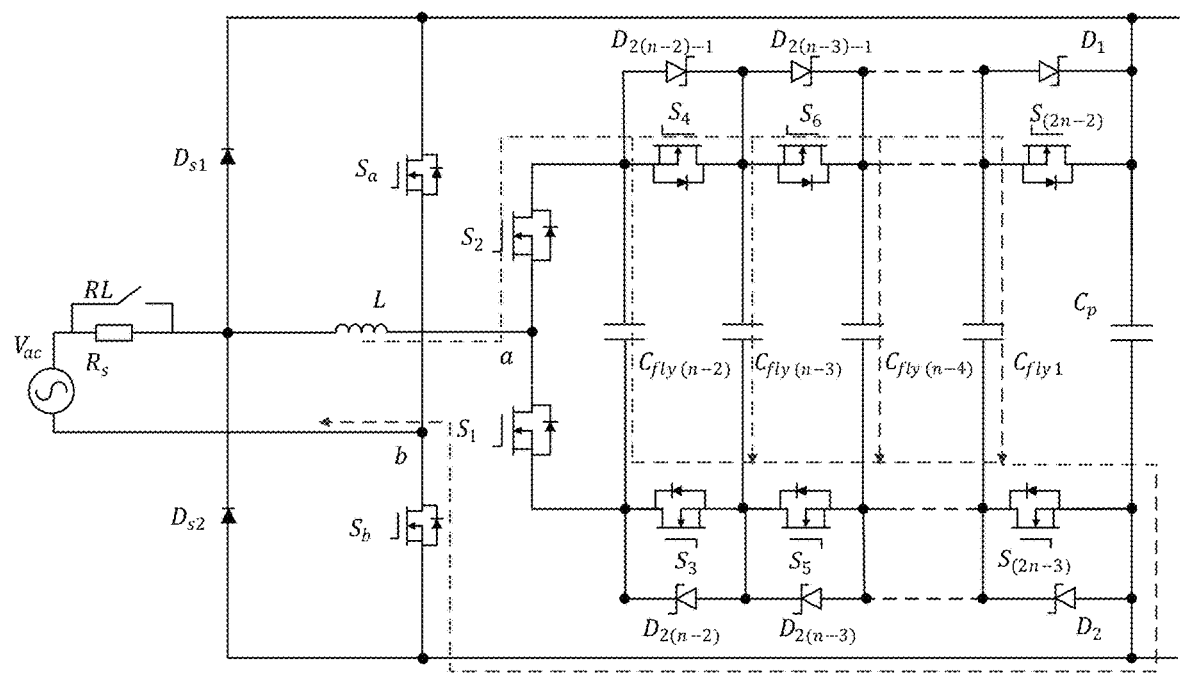
FIG. 10A is a schematic view of a charging loop (as shown by a dashed line) of the respective flying capacitors within a positive half period in the embodiment of FIG. 9.

As shown by a dashed line in FIG. 10A, when the controller begins to operate, and the power supply $V_{ac}$ operates in a positive half period, the controller controls the switches $S_3$ to $S_{2n-3}$ to turn on, and the power supply $V_{ac}$ can charge the flying capacitors $C_{fly1}$ to $C_{fly(n-2)}$ through the switches $S_2$ to $S_{2n-4}$, the switches $S_3$ to $S_{2n-3}$ and the switch $S_b$. In other embodiments, the controller can control the switches $S_2$ to $S_{2n-4}$, $S_3$ to $S_{2n-3}$ and $S_b$ to turn on, and the power supply $V_{ac}$ can charge the flying capacitors $C_{fly1}$ to $C_{fly(n-2)}$ through the switches $S_2$ to $S_{2n-4}$, the switches $S_3$ to $S_{2n-3}$ and the switch $S_b$. In other embodiments, the controller can control the switches $S_2$ to $S_{2n-4}$ and $S_3$ to $S_{2n-3}$ to turn on, and the power supply $V_{ac}$ can charge the flying capacitors $C_{fly1}$ to $C_{fly(n-2)}$ through the diode $D_{s1}$, the switches $S_2$ to $S_{2n-4}$, the switches $S_3$ to $S_{2n-3}$ and the switch $S_b$.

Figure 10B:
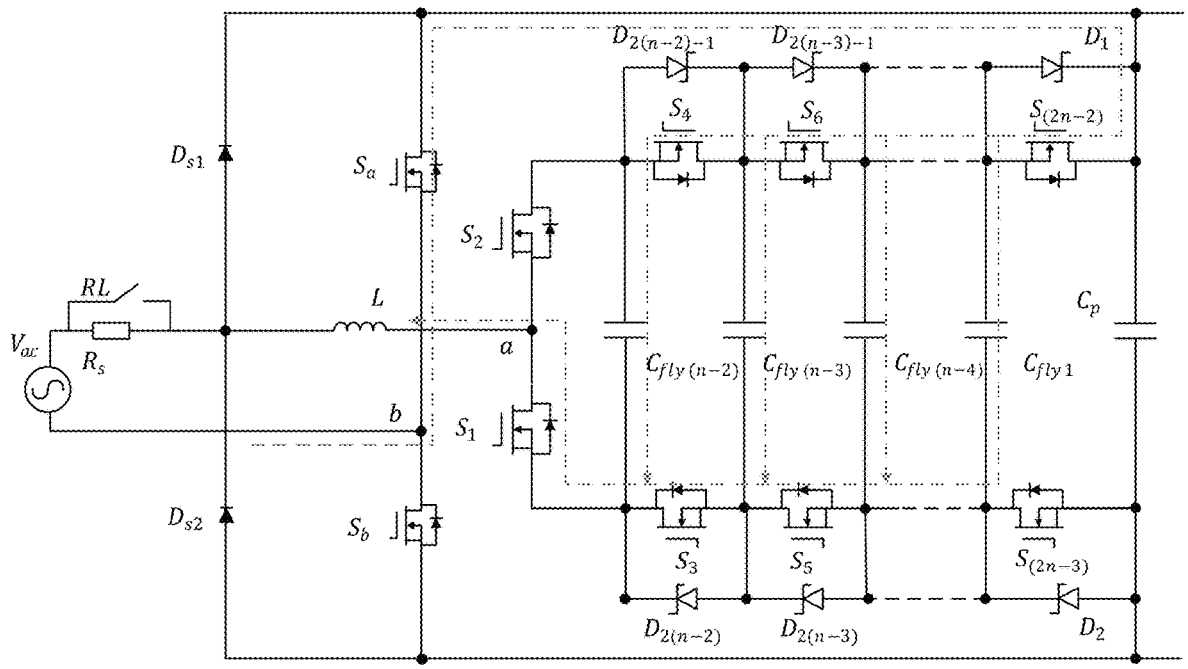
FIG. 10B is a schematic view of a charging loop (as shown by a dashed line) of the respective flying capacitors within a negative half period in the embodiment of FIG. 9.

As shown by a dashed line in FIG. 10B, when the controller begins to operate, and the power supply $V_{ac}$ operates in a negative half period, the controller controls the switches $S_2$ to $S_{2n-4}$ to turn on, and the power supply $V_{ac}$ can charge the flying capacitors $C_{fly1}$ to $C_{fly(n-2)}$ through the switches $S_2$ to $S_{2n-4}$, the switches $S_3$ to $S_{2n-3}$ and the switch $S_a$. In other embodiments, the controller can control the switches $S_2$ to $S_{2n-4}$, the switches $S_3$ to $S_{2n-3}$ and the switch $S_a$ to turn on, and the power supply $V_{ac}$ can charge the flying capacitors $C_{fly1}$ to $C_{fly(n-2)}$ through the switches $S_2$ to $S_{2n-4}$, the switches $S_3$ to $S_{2n-3}$ and the switch $S_a$. In other embodiments, the controller can control the switches $S_2$ to $S_{2n-4}$ and the switches $S_3$ to $S_{2n-3}$ to turn on, and the power supply $V_{ac}$ can charge the flying capacitors Cfly to $C_{fly(n-2)}$ through the diode $D_{s2}$, the switches $S_2$ to $S_{2n-4}$, the switches $S_3$ to $S_{2n-3}$ and the switch $S_a$.

When a voltage of the flying capacitor $C_{fly1}$ reaches $(n-1-i)/(n-1)$ times of $V_{Cp}$ (i=1, 2, 3, 4, 5, ..., and n-2), the corresponding switches of the second bridge arm 20 are turned off, and when voltage of each of all flying capacitors $C_{fly1}$ to $C_{fly(n-2)}$ reaches $(n-1-i)/(n-1)$ times of $V_{Cp}$, all switches of the second bridge arm 20 are turned off. Also, the charging loops of the flying capacitor are not affected regardless of whether the voltage regulation diodes exist or not.

After the n-level conversion circuit is powered off, since the diodes have a forward conduction voltage drop, when the DC bus voltage $V_{Cp}$ is decreased to be less than the voltage $V_{Cfly1}$ of the flying capacitor $C_{fly1}$, the voltage regulation diodes $D_1$ and $D_2$ connected in series to both sides of the flying capacitor $C_{fly1}$ are turned on forwardly, and the flying capacitor $C_{fly1}$ begins to discharge through the voltage regulation diodes $D_1$ and $D_2$, or the flying capacitor $C_{fly1}$ begins to discharge through the two switches at an outer side of the flying capacitor $C_{fly1}$. When the voltage $V_{Cflyi}$ of the flying capacitor $C_{fly1}$ is decreased to be less than the voltage $V_{Cfly(i+1)}$ of the flying capacitor $C_{fly(i+1)}$, the voltage regulation diodes connected in series to both sides of the flying capacitor $C_{fly(i+1)}$ are turned on forwardly, and the flying capacitor $C_{fly(i+1)}$ begins to discharge (i=1, 2, 3, ..., and n-2), or the flying capacitor $C_{fly(i+1)}$ begins to discharge through the switches at an outer side of the flying capacitor $C_{fly(i+1)}$.

In other embodiments, the electrical connection of the voltage regulation diodes in FIG. 9 can be altered as shown by a n-level conversion circuit 100-4 in FIG. 11. Compared with FIG. 9 and FIG. 11, the voltage regulation diodes in FIG. 9 are connected to both sides of the switches to be protected, while the voltage regulation diodes in FIG. 11 are connected between the corresponding flying capacitor and both ends of the DC bus capacitor $C_p$, and the clamping voltages of the voltage regulation diodes have more degrees, so configuration is more flexible.

As for the n-level conversion circuit 100-4 having a flying capacitor shown in FIG. 11, 2×(n-2) voltage regulation diodes are required in total to protect the switches of the second bridge arm 20, and a voltage $V_{Cflyi}$ of the flying capacitor $C_{fly1}$ is shown by formulas (11) and (12):

Positive Half Period:

$$V_{Cflyi}=V_{Cp}-V_{D(2i)} \text{ (if } V_{Cp}>V_{D(2i)}) \text{ } (i=1,2,3 \ldots n-2) \tag{11}$$

Negative Half Period:

$$V_{Cflyi}=V_{Cp}-V_{D(2i-1)} \text{ (if } V_{Cp}>V_{D(2i-1)}) \text{ } (i=1,2,3 \ldots n-2) \tag{12}$$

In some embodiments, if a voltage stress of the switches of the second bridge arm 20 is pre-judged not to satisfy the formulas (11) and (12) according to actual operating state, the voltage regulation diodes can only be connected between the flying capacitor satisfying the relations and both ends of the DC bus capacitor $C_p$ for protecting a group of switches at an outer side of the flying capacitor.

In some embodiments, the number of voltage regulation diodes at least can be two, and at most 2×(n-2).

After the n-level conversion circuit is powered off, since the diodes have a forward conduction voltage drop, when the DC bus voltage $V_{Cp}$ is decreased to be less than the voltage $V_{Cflyi}$ of the flying capacitor $C_{flyi}$, the voltage regulation diodes connected in series to both sides of the flying capacitor $C_{flyi}$ are turned on forwardly, and the flying capacitor $C_{flyi}$ begins to discharge through the voltage regulation diodes on both sides of the flying capacitor $C_{flyi}$, or the flying capacitor $C_{flyi}$ begins to discharge through the switches at an outer side of the flying capacitor $C_{flyi}$.

The disclosure further provides a method for pre-charging a multilevel conversion circuit having a flying capacitor. The multilevel conversion circuit may include a first bridge arm, a second bridge arm, a DC bus capacitor, a first voltage clamping module and a second voltage clamping module. The first bridge arm includes a plurality of switches connected in series. The second bridge arm includes a plurality of switches connected in series and a flying capacitor group, and a midpoint of the second bridge arm and a midpoint of the first bridge arm are connected to a power supply and an inductor to form a series branch. The DC bus capacitor is connected in parallel to the first bridge arm and the second bridge arm. The first voltage clamping module is connected between a first end of the flying capacitor group and a first end of the DC bus capacitor, and a second voltage clamping module is connected between a second end of the flying capacitor group and a second end of the DC bus capacitor.

As shown in FIG. 15, the pre-charging method 200 of the disclosure may be realized by the following steps.

In step S201, after the multilevel conversion circuit is powered on, the power supply charges the DC bus capacitor through the corresponding switches of the first bridge arm and the corresponding switches of the second bridge arm.

In some embodiments of the invention, the multilevel conversion circuit may further include a third bridge arm. The third bridge arm includes a plurality of switches connected in series, and a midpoint of the third bridge arm may be connected between the power supply and the inductor. After the multilevel conversion circuit is powered on, the power supply may charge the DC bus capacitor through the corresponding switches of the first bridge arm and the corresponding switches of the second bridge arm. Alternatively, the power supply may charge the DC bus capacitor through the corresponding switches of the third bridge arm and the corresponding switches of the first bridge arm.

In some embodiments of the invention, after the multilevel conversion circuit is powered on, and when a voltage between the midpoint of the first bridge arm and the midpoint of the second bridge arm is greater than a clamping voltage of the first voltage clamping unit or the second voltage clamping unit, the power supply may charge the flying capacitor group through the corresponding switches of the second bridge arm, the first voltage clamping module or the second voltage clamping module, and the corresponding switches of the first bridge arm.

In some embodiments of the invention, the multilevel conversion circuit may further include an auxiliary power supply and a controller. The auxiliary power supply may be connected to the DC bus capacitor for powering the controller, and the controller may be coupled to the auxiliary power supply and the plurality of switches of the second bridge arm. When a voltage of the DC bus capacitor reaches a preset value of starting voltage, the auxiliary power supply is started, and when a voltage of the DC bus capacitor reaches a preset value of operating voltage, the controller operates and controls the corresponding switches of the second bridge arm to turn on, and the power supply may charge the flying capacitor group through the corresponding switches of the first bridge arm and the corresponding switches of the second bridge arm.

In some embodiments of the invention, the multilevel conversion circuit may further include an auxiliary power supply and a controller. The auxiliary power supply may be connected to the DC bus capacitor for powering the controller, and the controller may be coupled to the auxiliary power supply and the plurality of switches of the second bridge arm. When a voltage of the DC bus capacitor reaches a preset value of starting voltage, the auxiliary power supply is started, and when a voltage of the DC bus capacitor reaches a preset value of operating voltage, the controller operates and controls the corresponding switches of the second bridge arm to turn on, and the power supply may charge the flying capacitor group through the corresponding switches of the first bridge arm and the corresponding switches of the second bridge arm. Alternatively, the power supply may charge the flying capacitor group through the corresponding switches of the first bridge arm, the corresponding switches of the second bridge arm and the corresponding switch of the third bridge arm.

In conclusion, the disclosure provides use of the technique for pre-charging the multilevel conversion circuit having a flying capacitor, which can satisfy application requirements of the three-level to n-level conversion circuits only by at least adding two voltage clamping units. The respective embodiments are only used to explain the disclosure, and the structures, configurations and corresponding control methods of the respective circuits can be changed. On the basis of the technical solution of the disclosure, any modifications and equivalent alternations of the individual circuit based on the principle of the invention shall not be excluded from the scope protected by the invention.

Exemplary embodiments of the invention have been shown and described in details. It shall be understood that the invention is not limited to the disclosed embodiments. Instead, the invention intends to cover various modifications and equivalent settings included in the spirit and scope of the appended claims.

What is claimed is:

1. A multilevel conversion circuit having a flying capacitor, comprising:
   a first bridge arm comprising a plurality of switches connected in series;
   a second bridge arm comprising a plurality of switches connected in series and a flying capacitor group, wherein a midpoint of the second bridge arm and a midpoint of the first bridge arm are connected to a series branch, wherein the series branch is defined by a power supply and an inductor;
   a DC bus capacitor connected in parallel to the first bridge arm and the second bridge arm;
   a first voltage clamping module between a first end of the flying capacitor group and a first end of the DC bus capacitor;
   a second voltage clamping module between a second end of the flying capacitor group and a second end of the DC bus capacitor;
   an auxiliary power supply connected to the DC bus capacitor, and
   a controller coupled to the auxiliary power supply and the plurality of switches of the second bridge arm, the auxiliary power supply provides power for the controller.

2. The multilevel conversion circuit of claim 1, wherein the power supply charges the DC bus capacitor through the corresponding switches of the first bridge arm and the corresponding switches of the second bridge arm after the multilevel conversion circuit is powered on.

3. The multilevel conversion circuit of claim 2, wherein, after the multilevel conversion circuit is powered on, when a voltage between the midpoint of the first bridge arm and the midpoint of the second bridge arm is greater than a clamping voltage of the first voltage clamping module or the second voltage clamping module, the power supply charges the flying capacitor group through the corresponding switches of the second bridge arm, the corresponding switches of the first bridge arm, and at least one of the first voltage clamping module and the second voltage clamping module.

4. The multilevel conversion circuit of claim 2, wherein when a voltage of the DC bus capacitor reaches a preset value of starting voltage, the auxiliary power supply is started; when a voltage of the DC bus capacitor reaches a preset value of operating voltage, the controller controls the corresponding switches of the second bridge arm to turn on, and the power supply charges the flying capacitor group through the corresponding switches of the first bridge arm and the corresponding switches of the second bridge arm.

5. The multilevel conversion circuit of claim 2, wherein the multilevel conversion circuit is a three-level conversion circuit; the second bridge arm comprises a first switch, a second switch, a third switch and a fourth switch connected in series; the flying capacitor group comprises a flying capacitor disposed between a junction node of the first switch and the second switch and a junction node of the third switch and the fourth switch;
   wherein the first voltage clamping module comprises a first voltage clamping unit, and the first voltage clamping unit is electrically connected between a first end of the flying capacitor and the first end of the DC bus capacitor;
   wherein the second voltage clamping module comprises a second voltage clamping unit, and the second voltage clamping unit is electrically connected between a second end of the flying capacitor and the second end of the DC bus capacitor.

6. The multilevel conversion circuit of claim 5, wherein, after the multilevel conversion circuit is powered on,
   when a voltage between the midpoint of the second bridge arm and the midpoint of the first bridge arm is greater than a clamping voltage of the second voltage clamping unit, the power supply charges the flying capacitor through the corresponding switches of the second bridge arm, the second voltage clamping unit, and the corresponding switches of the first bridge arm;

when a voltage between the midpoint of the first bridge arm and the midpoint of the second bridge arm is greater than a clamping voltage of the first voltage clamping unit, the power supply charges the flying capacitor through the corresponding switches of the first bridge arm, the first voltage clamping unit, and the corresponding switches of the second bridge arm.

7. The multilevel conversion circuit of claim 6, wherein when a voltage of the DC bus capacitor reaches a preset value of operating voltage, a voltage of the flying capacitor is the maximum value among a difference between the preset value of operating voltage and the clamping voltage of the first voltage clamping unit, a difference between the preset value of operating voltage and the clamping voltage of the second voltage clamping unit, and zero.

8. The multilevel conversion circuit of claim 5, wherein when a voltage of the DC bus capacitor reaches a preset value of starting voltage, the auxiliary power supply is started; when a voltage of the DC bus capacitor reaches a preset value of operating voltage, the controller controls the corresponding switches of the second bridge arm to turn on, and the power supply charges the flying capacitor through the corresponding switches of the first bridge arm and the corresponding switches of the second bridge arm; or the power supply charges the flying capacitor through the corresponding switches of the first bridge arm, the corresponding switches of the second bridge arm, and the corresponding switches of the third bridge arm, when a voltage of the flying capacitor reaches a half of the preset value of operating voltage, the controller controls all switches of the second bridge arm to turn off, and the flying capacitor completes charging.

9. The multilevel conversion circuit of claim 5, wherein when a voltage of the DC bus capacitor is less than a voltage of the flying capacitor, the flying capacitor is discharged through the first voltage clamping unit and the second voltage clamping unit, or the flying capacitor is discharged through the first switch and the fourth switch.

10. The multilevel conversion circuit of claim 2, wherein the multilevel conversion circuit is a n-level conversion circuit, and the second bridge arm comprises (2n−2) switches connected in series; the flying capacitor group comprises (n−2) flying capacitors; the i-th flying capacitor is disposed between the i-th switch and the (2n−1−i)th switch of the second bridge arm, where i is 1, 2, 3, 4, . . . , n−2, and n is a natural number greater than 3;

wherein the first voltage clamping module comprises (n−2) first voltage clamping units; the 1st first voltage clamping unit is disposed between a first end of the 1st flying capacitor and the first end of the DC bus capacitor, and the j-th first voltage clamping unit is disposed between a first end of the j-th flying capacitor and a first end of the (j−1)th flying capacitor;

wherein the second voltage clamping module comprises (n−2) second voltage clamping units; the 1st second voltage clamping unit is disposed between a second end of the 1st flying capacitor and the second end of the DC bus capacitor, and the j-th second voltage clamping unit is disposed between a second end of the j-th flying capacitor and a second end of the (j−1)th flying capacitor, where j is 2, 3, 4, . . . , n−2.

11. The multilevel conversion circuit of claim 10, wherein the first voltage clamping circuit further comprises (n−2) first impedance circuits; the second voltage clamping circuit further comprises (n−2) second impedance circuits; each of the first impedance circuits is connected in series to the corresponding first voltage clamping unit, and each of the second impedance circuits is connected in series to the corresponding second voltage clamping unit.

12. The multilevel conversion circuit of claim 10, wherein the first voltage clamping circuit further comprises (n−2) first diodes; the second voltage clamping circuit further comprises (n−2) second diodes; each of the first diodes is connected in series to the corresponding first voltage clamping unit, and each of the second diodes is connected in series to the corresponding second voltage clamping unit.

13. The multilevel conversion circuit of claim 10, wherein, after the multilevel conversion circuit is powered on, when a voltage between the midpoint of the first bridge arm and the midpoint of the second bridge arm is greater than a sum of the clamping voltages of the 1st to the i-th first voltage clamping units, or a sum of the clamping voltages of the 1st to the i-th second voltage clamping units, the power supply charges the i-th flying capacitor through the corresponding switches of the second bridge arm, the 1st to the i-th first voltage clamping units or the 1st to the i-th second voltage clamping units, and the corresponding switches of the first bridge arm.

14. The multilevel conversion circuit of claim 10, wherein when a voltage of the DC bus capacitor reaches a preset value of starting voltage, the auxiliary power supply is started; when a voltage of the DC bus capacitor reaches a preset value of operating voltage, the controller controls the corresponding switches of the second bridge arm to turn on, wherein the power supply charges the (n−2) flying capacitors through the corresponding switches of the first bridge arm and the corresponding switches of the second bridge arm; or wherein the power supply charges the (n−2) flying capacitors through the corresponding switches of the first bridge arm, the corresponding switches of the second bridge arm, and the corresponding switches of the third bridge arm.

15. The multilevel conversion circuit of claim 14, wherein when a voltage of the i-th flying capacitor reaches (n−1−i)/(n−1) times of the preset value of operating voltage, the controller controls the corresponding switches of the second bridge arm to turn off, and after the (n−2) flying capacitors complete charging, the controller controls all switches of the second bridge arm to turn off.

16. The multilevel conversion circuit of claim 10, wherein when a voltage of the i-th flying capacitor is less than a voltage of the (i+1)th flying capacitor, the (i+1)th flying capacitor is discharged through the (i+1)th first voltage clamping unit and the (i+1)th second voltage clamping unit, and/or discharged through the (i+1)th switch and the (2n−2−i)th switch; or when a voltage of the DC bus capacitor is less than a voltage of the 1st flying capacitor, the 1st flying capacitor is discharged through the 1st first voltage clamping unit and the 1st second voltage clamping unit, and/or discharged through the first switch and the (2n−2)th switch.

17. The multilevel conversion circuit of claim 2, wherein the multilevel conversion circuit is a n-level conversion circuit; the second bridge arm comprises (2n−2) switches connected in series; the flying capacitor group comprises (n−2) flying capacitors; the i-th flying capacitor is disposed between the i-th switch and the (2n−1−i)th switch of the second bridge arm, where i is 1, 2, 3, . . . , and n−2, and n is a natural number greater than 3;

wherein the first voltage clamping module comprises (n−2) first voltage clamping units; each of the first voltage clamping units is disposed between a first end of the corresponding flying capacitor and the first end of the DC bus capacitor;

wherein the second voltage clamping module comprises (n−2) second voltage clamping units; each of the second voltage clamping units is disposed between a second end of the corresponding flying capacitor and the second end of the DC bus capacitor.

18. The multilevel conversion circuit of claim 2, wherein the multilevel conversion circuit is a n-level conversion circuit; the second bridge arm comprises (2n−2) switches connected in series; the flying capacitor group comprises (n−2) flying capacitors; the i-th flying capacitor is disposed between the i-th switch and the (2n−1−i)th switch of the second bridge arm, where i is 1, 2, 3, . . . , and n−2, and n is a natural number greater than 3;

wherein the first voltage clamping module comprises at least one first voltage clamping unit; the at least one first voltage clamping unit is disposed between a first end of the corresponding flying capacitor and the first end of the DC bus capacitor;

wherein the second voltage clamping module comprises at least one second voltage clamping unit; the at least one second voltage clamping unit is disposed between a second end of the corresponding flying capacitor and the second end of the DC bus capacitor.

19. The multilevel conversion circuit of claim 1, further comprising a third bridge arm, wherein the third bridge arm comprises a plurality of switches connected in series, and a midpoint of the third bridge arm is connected between the power supply and the inductor.

20. The multilevel conversion circuit of claim 19, wherein after the multilevel conversion circuit is powered on, the power supply charges the DC bus capacitor through the corresponding switches of the first bridge arm and the corresponding switches of the second bridge arm; and/or the power supply charges the DC bus capacitor through the corresponding switches of the third bridge arm and the corresponding switches of the first bridge arm.

21. The multilevel conversion circuit of claim 20, wherein when a voltage of the DC bus capacitor reaches a preset value of starting voltage, the auxiliary power supply is started; when a voltage of the DC bus capacitor reaches a preset value of operating voltage, the controller controls the corresponding switches of the second bridge arm to turn on, and the power supply charges the flying capacitor group through the corresponding switches of the first bridge arm and the corresponding switches of the second bridge arm, or the power supply charges the flying capacitor group through the corresponding switches of the first bridge arm, the corresponding switches of the second bridge arm, and the corresponding switches of the third bridge arm.

22. The multilevel conversion circuit of claim 1, further comprising a current limiting circuit, wherein the current limiting circuit is electrically connected in series to the series branch, and the current limiting circuit comprises a current limiting resistor and a switch connected in parallel.

23. The multilevel conversion circuit of claim 1, further comprising a current limiting circuit, wherein the current limiting circuit is electrically connected in series to the DC bus capacitor, and the current limiting circuit comprises a current limiting resistor and a switch connected in parallel.

24. The multilevel conversion circuit of claim 1, wherein the first voltage clamping module comprises at least one first voltage clamping unit and at least one first impedance circuit, and the at least one first impedance circuit is electrically connected in series to the corresponding first voltage clamping unit; and wherein the second voltage clamping module comprises at least one second voltage clamping unit and at least one second impedance circuit, and the at least one second impedance circuit is electrically connected in series to the corresponding second voltage clamping unit.

25. The multilevel conversion circuit of claim 1, wherein the first voltage clamping module comprises at least one first voltage clamping unit and at least one first diode connected in series to the corresponding first voltage clamping unit, a forward conduction direction of the first diode is opposite to a forward conduction direction of the corresponding first voltage clamping unit;

wherein the second voltage clamping module comprises at least one second voltage clamping unit and at least one second diode connected in series to the corresponding second voltage clamping unit, a forward conduction direction of the second diode is opposite to a forward conduction direction of the corresponding second voltage clamping unit.

26. A method for pre-charging a multilevel conversion circuit having a flying capacitor, comprising:

providing a multilevel conversion circuit, comprising:

a first bridge arm comprising a plurality of switches connected in series;

a second bridge arm comprising a plurality of switches connected in series and a flying capacitor group, wherein a midpoint of the second bridge arm and a midpoint of the first bridge arm are connected to a power supply and an inductor to form a series branch;

a DC bus capacitor connected to both the first bridge arm and the second bridge arm in parallel;

a first voltage clamping module connected between a first end of the flying capacitor group and a first end of the DC bus capacitor;

a second voltage clamping module connected between a second end of the flying capacitor group and a second end of the DC bus capacitor;

an auxiliary power supply connected to the DC bus capacitor, and a controller coupled to the auxiliary power supply and the plurality of switches of the second bridge arm, the auxiliary power supply provides power for the controller;

powering the multilevel conversion circuit;

charging the DC bus capacitor through the corresponding switches of the first bridge arm and the corresponding switches of the second bridge arm.

27. The method according to claim 26, wherein the multilevel conversion circuit further comprises a third bridge arm, and the third bridge arm comprises a plurality of switches connected in series, and a midpoint of the third bridge arm is connected with the power supply and the inductor;
- after the multilevel conversion circuit is powered on, the power supply charges the DC bus capacitor through the corresponding switches of the first bridge arm and the corresponding switches of the second bridge arm; and/or the power supply charges the DC bus capacitor through the corresponding switches of the third bridge arm and the corresponding switches of the first bridge arm.

28. The method according to claim 27, wherein
- when a voltage of the DC bus capacitor reaches a preset value of starting voltage, the auxiliary power supply is started; when a voltage of the DC bus capacitor reaches a preset value of operating voltage, the controller controls the corresponding switches of the second bridge arm to turn on,
- wherein the power supply charges the flying capacitor group through the corresponding switches of the first bridge arm and the corresponding switches of the second bridge arm, or the power supply charges the flying capacitor group through the corresponding switches of the first bridge arm, the corresponding switches of the second bridge arm and the corresponding switch of the third bridge arm.

29. The method according to claim 26, wherein after the multilevel conversion circuit is powered on, when a voltage between the midpoint of the first bridge arm and the midpoint of the second bridge arm is greater than a clamping voltage of the first voltage clamping module or the second voltage clamping module, the power supply charges the flying capacitor group through the corresponding switches of the second bridge arm, the first voltage clamping module or the second voltage clamping module, and the corresponding switches of the first bridge arm.

30. The method according to claim 26, wherein
- when a voltage of the DC bus capacitor reaches a preset value of starting voltage, the auxiliary power supply is started; when a voltage of the DC bus capacitor reaches a preset value of operating voltage, the controller controls the corresponding switches of the second bridge arm to turn on, and the power supply charges the flying capacitor group through the corresponding switches of the first bridge arm and the corresponding switches of the second bridge arm.

* * * * *